US012416887B2

(12) United States Patent
Miyajima

(10) Patent No.: US 12,416,887 B2
(45) Date of Patent: Sep. 16, 2025

(54) IMAGE FORMING APPARATUS AND CONTROL METHOD OF IMAGE FORMING APPARATUS

(71) Applicant: CANON KABUSHIKI KAISHA, Tokyo (JP)

(72) Inventor: Jun Miyajima, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 18/438,273

(22) Filed: Feb. 9, 2024

(65) Prior Publication Data

US 2024/0272572 A1 Aug. 15, 2024

(30) Foreign Application Priority Data

Feb. 15, 2023 (JP) ................................. 2023-021714

(51) Int. Cl.

| | |
|---|---|
| ***G03G 15/23*** | (2006.01) |
| ***G03G 15/00*** | (2006.01) |
| ***G03G 21/02*** | (2006.01) |

(52) U.S. Cl.

CPC ....... *G03G 15/234* (2013.01); *G03G 15/5025* (2013.01); *G03G 15/6502* (2013.01); *G03G 21/02* (2013.01); *G03G 2215/00734* (2013.01); *G03G 2215/00751* (2013.01)

(58) Field of Classification Search

CPC ............. G03G 15/234; G03G 15/5025; G03G 15/6502; G03G 21/02; G03G 2215/00734; G03G 2215/00751

See application file for complete search history.

(56) References Cited

U.S. PATENT DOCUMENTS

2013/0058694 A1* 3/2013 Miyajima .......... G03G 15/6579 399/401
2015/0156357 A1* 6/2015 Yabe ...................... H04N 1/047 358/498
2016/0065753 A1* 3/2016 Tachibana ............. G06F 3/1234 358/1.14
2019/0092592 A1* 3/2019 Suzuki ................... B65H 5/068

FOREIGN PATENT DOCUMENTS

JP 2007091398 A 4/2007
JP 2022026815 A 2/2022

* cited by examiner

*Primary Examiner* — David H Banh

(74) *Attorney, Agent, or Firm* — Canon U.S.A., Inc. IP Division

(57) ABSTRACT

In a case where a type of a feeding standby sheet on a storage unit and a type of a refeeding standby sheet on a reconveyance path are the same, an image forming unit forms an image on one side of a feeding standby sheet on the storage unit, and in a case where a type of a feeding standby sheet on the storage unit and a type of a refeeding standby sheet on the reconveyance path are not the same, the image forming unit forms an image on another side of a refeeding standby sheet on the reconveyance path.

23 Claims, 15 Drawing Sheets

FIG. 10

| SHEET SIZE | SHEET TYPE | NUMBER OF CIRCULATED SHEETS | CONVEYANCE SPEED |
|---|---|---|---|
| A4 | PLAIN PAPER | 5 | CONSTANT SPEED |
| A4 | THICK PAPER | 5 | HALF SPEED |
| A3 | PLAIN PAPER | 3 | CONSTANT SPEED |
| A3 | THICK PAPER | 3 | HALF SPEED |

IMAGE FORMING APPARATUS AND CONTROL METHOD OF IMAGE FORMING APPARATUS

BACKGROUND

Field of the Disclosure

The present disclosure relates to an image forming apparatus and a control method of an image forming apparatus.

Description of the Related Art

Japanese Patent Application Laid-Open No. 2022-26815 discusses an image forming apparatus including an image forming unit that performs printing onto a sheet based on a print control parameter, and a sheet feeding unit that feeds sheets to the image forming unit via a conveyance path. A media sensor is provided on a conveyance path, and detects the type of a sheet fed from the sheet feeding unit. A first storage unit stores a print control parameter for each sheet type. A second storage unit stores a history of a sheet type detected by the media sensor, for each sheet feeding unit. A control unit enables a user to change a print control parameter corresponding to a sheet type in accordance with a sheet feeding unit selected by the user, based on the history stored in the second storage unit. The control unit additionally stores the changed print control parameter into the first storage unit as a user-defined print control parameter corresponding to the sheet type.

Japanese Patent Application Laid-Open No. 2007-91398 discusses an image forming apparatus that uses ink and has a duplex printing function. A conveyance unit conveys recording paper. A pressing unit presses recording paper against the conveyance unit. In the case of performing duplex printing, the control unit controls simplex-printed recording paper to stand by on the upstream side of the conveyance unit in a conveyance direction.

Japanese Patent No. 3768785 discusses an image forming apparatus including an accommodation unit that accommodates sheets, and an image forming unit that forms an image onto a sheet fed from the accommodation unit. A sheet refeeding unit conveys a sheet bearing an image formed by the image forming unit, via a circulation path, and refeeds the sheet to the image forming unit. A determination unit determines the size and the material of a sheet. In accordance with the size and the material of the sheet that have been determined by the determination unit, the control unit controls the number of sheets that can be circulated via the circulation path. The control unit varies the number of sheets that can be circulated via the circulation path, between a case where the determination unit determines the material of the sheet to be first material, and a case where the determination unit determines the material of the sheet to be second material.

In Japanese Patent Application Laid-Open No. 2022-26815, because the media sensor detects the type of a sheet fed from the sheet feeding unit, the type of the sheet cannot be detected before sheet feeding, and depending on the type of a fed sheet, a jam (paper jam) sometimes occurs in duplex image formation.

SUMMARY

The present disclosure is directed to enabling the prevention of jam occurrence in duplex image formation.

According to an aspect of the present disclosure, an image forming apparatus includes a storage unit configured to store a sheet, an image forming unit configured to form an image onto the sheet, a reconveyance path for reconveying a sheet on which an image is formed by the image forming unit on one side, to the image forming unit to form an image on another side of the sheet on which the image is formed on the one side, a detection unit that is provided on a conveyance path between the storage unit and the image forming unit, and configured to detect a type of a sheet conveyed from the storage unit, and a control unit configured to cause the image forming unit to form an image on one side of a first sheet on the storage unit, then cause the image forming unit to form an image on one side of a second sheet on the storage unit, and then cause the image forming unit to form an image on another side of the first sheet on the reconveyance path, wherein, in a case where a type of a third sheet on the storage unit and a type of the second sheet on the reconveyance path are the same, after the control unit causes the image forming unit to form an image on another side of the first sheet, the control unit causes the image forming unit to form an image on one side of the third sheet on the storage unit, and then causes the image forming unit to form an image on another side of the second sheet on the reconveyance path, and wherein, in a case where a type of the third sheet on the storage unit and a type of the second sheet on the reconveyance path are not the same, after the control unit causes the image forming unit to form an image on another side of the first sheet, the control unit causes the image forming unit to form an image on another side of the second sheet on the reconveyance path, and then causes the image forming unit to form an image on one side of the third sheet on the storage unit.

Further features of the present disclosure will become apparent from the following description of exemplary embodiments with reference to the attached drawings.

BRIEF DESCRIPTION OF THE DRAWINGS

FIG. 10 is a diagram illustrating an example of a table for determining the number of sheets to be circulated for duplex printing, and a conveyance speed.

DESCRIPTION OF THE EMBODIMENTS

Figure 1:
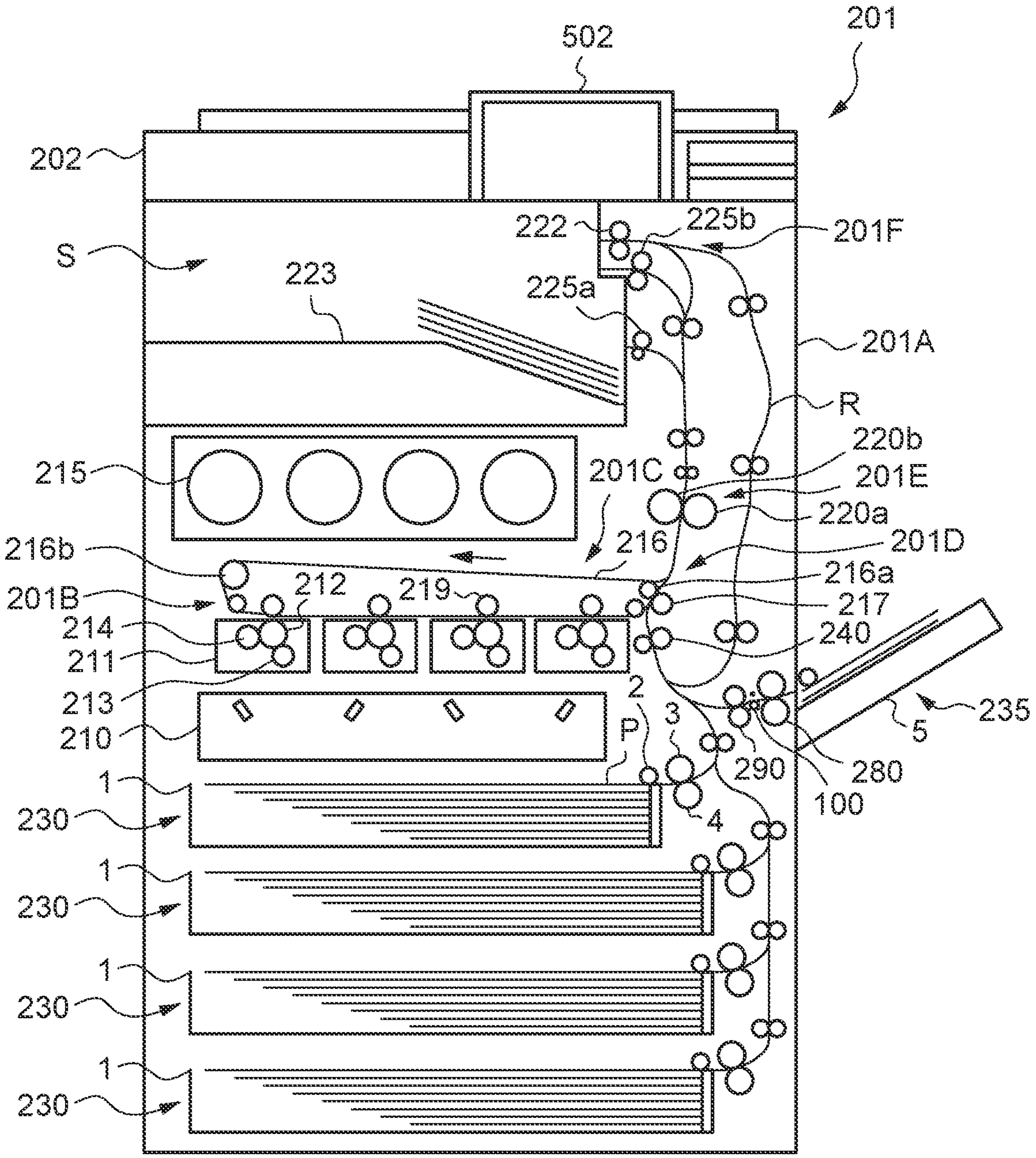
FIG. 1 is a cross-sectional view illustrating a configuration example of an image forming apparatus.

Hereinafter, exemplary embodiments will be described with reference to the drawings. The exemplary embodiment to be described below is an example, and the present disclosure is not limited to the following exemplary embodiment. In the following exemplary embodiment, the same components will be described using the same reference numerals allocated thereto.

Figure 2:
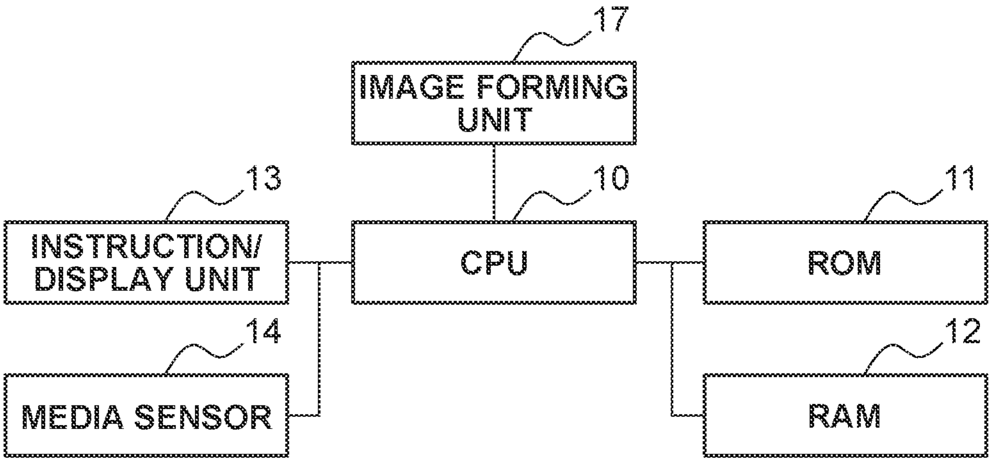
FIG. 2 is a block diagram illustrating an example of major components to be controlled by a central processing unit (CPU).

FIG. 1 is a cross-sectional view illustrating a configuration example of an image forming apparatus 201 according to a first exemplary embodiment. FIG. 2 is a diagram illustrating an example of major components to be controlled by a central processing unit (CPU) 10 of the image forming apparatus 201 according to the present exemplary embodiment. First of all, a basic configuration and an operation of the image forming apparatus 201 according to the present exemplary embodiment will be described with reference to FIGS. 1 and 2.

The CPU 10 illustrated in FIG. 2 is a control unit that controls the entire image forming apparatus 201. A read-only memory (ROM) 11 stores control programs according to the present exemplary embodiment and default values such as various setting values. By executing a control program according to the present exemplary embodiment that is read out from the ROM 11, the CPU 10 implements a procedure of image formation and a procedure of each flowchart, which will be described below.

Under the control of the CPU 10, a random access memory (RAM) 12 stores various types of information. The RAM 12 stores a print control parameter in a first storage region for each sheet type, which will be described in detail below. The RAM 12 is desirably a rewritable memory that does not require a storage holding operation. Furthermore, as described below, in a case where a user has changed a print control parameter corresponding to a sheet type that has been referred to, the CPU 10 additionally stores the changed print control parameter in the first storage region as a user-defined print control parameter corresponding to the sheet type.

An instruction/display unit 13 includes a panel that can display an operation screen, and a button. If a print operation start instruction is input, the instruction/display unit 13 transmits instruction information indicating the instruction, to the CPU 10. The instruction information indicating a print operation start instruction may be input from an external apparatus such as a personal computer, a tablet terminal, or a smartphone that is connected via a network (not illustrated), instead of being input by the user operating the instruction/display unit 13. If instruction information indicating a print operation start instruction is input, the CPU 10 drives a sheet feeding conveyance motor (not illustrated) in accordance with the instruction information, and controls the sheet feeding conveyance motor to perform sheet feeding conveyance. In addition, by setting a print control parameter for an image forming unit 17, the CPU 10 controls image formation (printing) to be executed by the image forming unit 17.

The image forming unit 17 corresponds to an image forming unit 201B illustrated in FIG. 1, and performs printing onto a sheet based on a print control parameter set by the CPU 10. A media sensor 14 is provided on a sheet conveyance path, and detects the type of a sheet fed via the sheet conveyance path.

In FIG. 1, the image forming apparatus 201 includes an image forming apparatus main body 201A and an image forming unit 201B that forms an image onto a sheet. An image reading apparatus 202 is installed above the image forming apparatus main body 201A substantially horizontally, and a discharge space S for sheet discharge is formed between the image reading apparatus 202 and the image forming apparatus main body 201A.

A cassette sheet feeding unit 230 feeds a sheet (paper) P from a sheet feeding cassette 1 serving as a sheet accommodation unit that accommodates the sheet P. The cassette sheet feeding unit 230 includes the sheet feeding cassette 1, a pickup roller 2 serving as a sheet feeding unit, and a separation unit for separating the sheet P fed from the pickup roller 2. The separation unit includes a feed roller 3 and a retard roller 4. A manual feeding unit 235 feeds the sheet P from a manual sheet feeding tray 5 serving as a unit that holds the sheet P. Similarly to the cassette sheet feeding unit 230, the manual feeding unit 235 includes a sheet feeding unit and a separation unit. The manual feeding unit 235 is a storage unit that stores the sheet P.

The image forming unit 201B serving as an image forming unit is a four-drum full-color system image forming unit, and includes a laser scanner 210 and four process cartridges 211 that form a four-color toner image using yellow (Y) toner, magenta (M) toner, cyan (C) toner, and black (K) toner.

Each of the process cartridges 211 includes a photosensitive drum 212, a charger 213 serving as a charging unit, and a developing device 214 serving as a developing unit. In addition, the image forming unit 201B includes a secondary transfer unit 201D and a fixing unit 201E that are arranged above the process cartridges 211. A toner cartridge 215 supplies toner to the developing device 214.

The secondary transfer unit 201D includes a transfer belt 216 stretched around a drive roller 216*a* and a tension roller 216*b*. A primary transfer roller 219 that contacts the transfer belt 216 at a position at which the primary transfer roller 219 faces the photosensitive drum 212 is provided on the inner side of the transfer belt 216. The transfer belt 216 is rotated in an arrow direction by the drive roller 216*a* driven by a drive unit (not illustrated). A secondary transfer roller 217 that transfers a color image formed on the transfer belt 216, onto the sheet P is provided at a position in the secondary transfer unit 201D at which the secondary transfer roller 217 faces the drive roller 216*a*. Furthermore, the fixing unit 201E is arranged above the secondary transfer roller 217, and a first discharge roller pair 225*a*, a second discharge roller pair 225*b* and a duplex reversing unit 201F are arranged above the left part of the fixing unit 201E. In the duplex reversing unit 201F, a reversing roller pair 222 that can perform normal rotation and reverse rotation, and a reconveyance path R for reconveying the sheet P on which an image is formed over one surface, again to the secondary transfer unit 201D are provided.

A display 502 that receives an operation from the user is provided in an upper part of the image forming apparatus 201.

Operation of Image Forming Apparatus

Next, an image formation operation to be performed by the image forming apparatus 201 will be described. First of all, if the image forming apparatus 201 receives image data of a document to be printed, the image data is subjected to image processing and then converted into an electrical signal, and transmitted to the laser scanner 210 of the image forming unit 201B. In the image forming unit 201B, the surfaces of the photosensitive drums 212 that are uniformly charged by the chargers 213 to predetermined polarity and potential are sequentially exposed to laser. Accordingly, yellow, magenta, cyan, and black electrostatic latent images are sequentially formed on the photosensitive drums 212 of the respective process cartridges 211.

After that, the electrostatic latent images are visualized by developing the electrostatic latent images using the respective color toners, and by a primary transfer bias applied to the primary transfer roller 219, color toner images on the respective photosensitive drums 212 are sequentially transferred onto the transfer belt 216 in an overlaid manner. A toner image is accordingly formed on the transfer belt 216. Concurrently with the toner image formation operation, the sheets P are conveyed by the cassette sheet feeding unit 230 one by one to a registration roller pair 240, and skew is corrected by the registration roller pair 240. After skew is corrected, the sheet P is conveyed by the registration roller pair 240 to the secondary transfer unit 201D, and in the secondary transfer unit 201D, by a secondary transfer bias applied to the secondary transfer roller 217, the toner images are collectively transferred onto the sheet P.

Next, the sheet P bearing a transferred toner image is conveyed to the fixing unit 201E. In a roller nip portion formed by a pressing roller 220*a* and a heat roller 220*b*, the sheet P receives heat and pressure, and the color toners are melt and mixed and fixed onto the sheet P as a color image. After that, the sheet P bearing the fixed image is discharged to the discharge space S by the first discharge roller pair 225*a* and the second discharge roller pair 225*b* that are provided on the downstream side of the fixing unit 201E, and stacked onto a stacking unit 223 protruding from the bottom surface of the discharge space S. When images are to be formed on both sides of the sheet P, after the images are fixed, the sheet P is conveyed to the reconveyance path R by the reversing roller pair 222, and conveyed again to the image forming unit 201B.

The media sensor 14 in FIG. 2 is a paper type detection sensor 100 in FIG. 1 that is provided on the sheet conveyance path, and detects the type (paper type) of a sheet fed via the sheet conveyance path. The paper type refers to the type of a sheet. The media sensor 14 detects a surface property and a thickness of a conveyed sheet, and the CPU 10 determines a sheet type based on the detection result. In the present exemplary embodiment, processing in which the media sensor 14 detects a surface property and a thickness of a sheet, and the CPU 10 determines a sheet type based on the detection result will be represented as processing in which the media sensor 14 detects or determines a sheet type. The details will be described below. In the present exemplary embodiment, only in a case where a sheet is conveyed from the manual feeding unit 235, the sheet passes through the media sensor 14 (the paper type detection sensor 100), and determination of a sheet type becomes executable.

<Description of Media Sensor>

Figure 3:
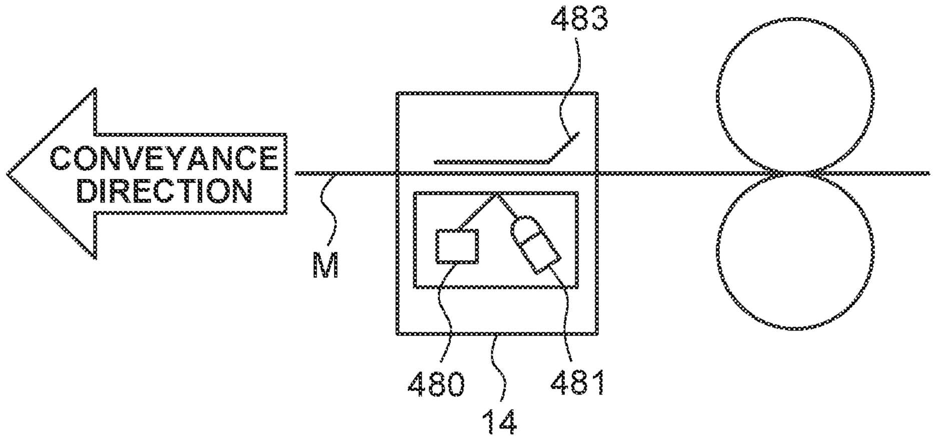
FIG. 3 is a diagram illustrating a configuration example of a media sensor.

Next, an example of the media sensor 14 will be described with reference to FIG. 3. A light-emitting diode (LED) 481 serving as a light-emitting element and a photodiode 480 serving as a light receiving element are arranged inside the media sensor 14. A reflected light amount of light emitted by the LED 481 can be detected by the photodiode 480. In addition, the media sensor 14 is provided with a guide portion 483 that the sheet P enters.

The CPU 10 receives a detection signal of the photodiode 480 as an output value of the media sensor 14. In accordance with a difference in received value that is attributed to a surface property and a thickness of each sheet, the CPU 10 can determine the type of a passed sheet. Then, in accordance with the detected type of the sheet, the CPU 10 controls an image formation speed and a target temperature of the fixing unit 201E to be an optimum speed and an optimum temperature.

As described above, in the present exemplary embodiment, by the CPU 10 determining the type of a sheet using the media sensor 14, it becomes unnecessary for the user to make a setting in consideration of the type of the sheet. Thus, in the image forming apparatus 201 according to the present exemplary embodiment, a mode (hereinafter, will be referred to as a media automatic setting mode) in which the media sensor 14 determines the type of a sheet and a print control parameter is automatically set in accordance with the type of the sheet is prepared.

On the other hand, in the image forming apparatus 201 according to the present exemplary embodiment, a mode (hereinafter, will be referred to as a media manual setting mode) in which the user manually sets the type of a sheet to be used is also prepared. By operating the instruction/display unit 13, the user can preset the media automatic setting mode or the media manual setting mode of the manual feeding unit 235.

A default mode is set to the media automatic setting mode of the manual feeding unit 235. A setting value indicating which of the media automatic setting mode and the media manual setting mode the set mode is stored in the RAM 12. The above-described configuration of the media sensor 14 is an example, and the configuration of the media sensor 14 is not limited to this configuration. For example, the media sensor 14 may have a configuration in which an ultrasonic sensor such as a piezoelectric element is combined in addition to the light-emitting element and the light receiving element, or these other configurations may be included.

Figure 4:
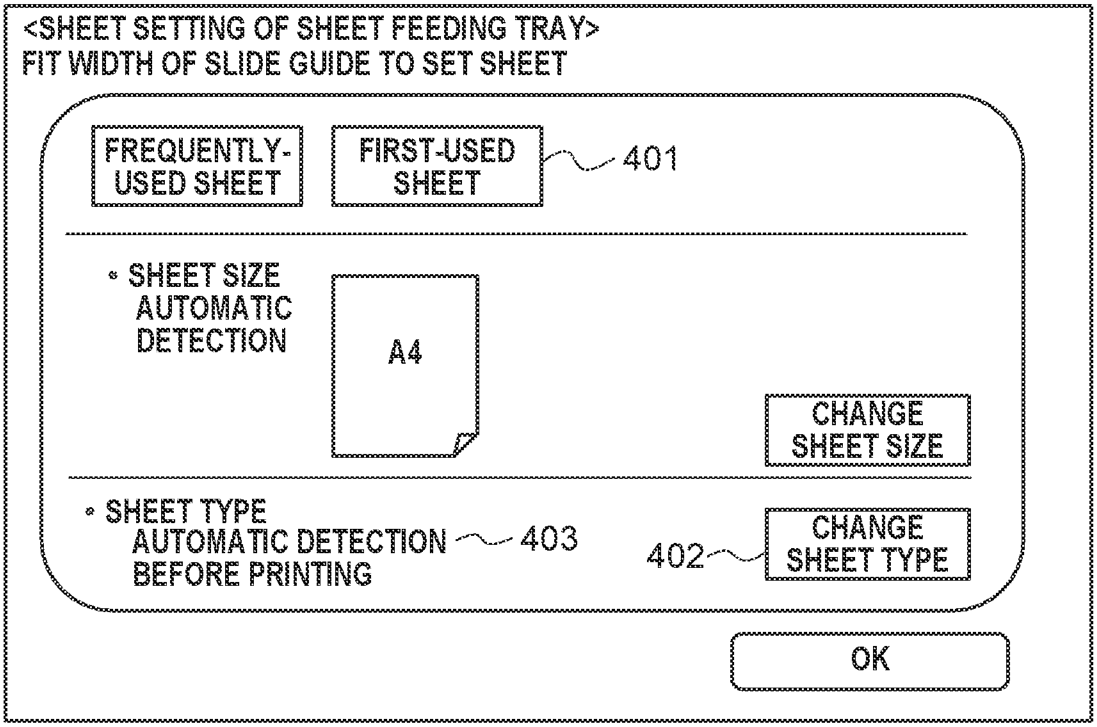
FIG. 4 is a diagram illustrating an example of a sheet setting screen.

FIG. 4 is a diagram illustrating a sheet setting screen for automatically detecting the type of a sheet using the media sensor 14. In the present exemplary embodiment, only in a case where a sheet is conveyed from the manual feeding unit 235, the sheet passes through the paper type detection sensor 100. Thus, the media sensor 14 can automatically detect the type of only a sheet on the manual feeding unit 235.

If a bundle of paper is placed on the manual feeding unit 235 on which a bundle of paper does not exist, the CPU 10 displays the sheet setting screen in FIG. 4 on the instruction/display unit 13, and prompts the user to set either the media automatic setting mode or the media manual setting mode for sheets on the manual feeding unit 235. For example, by the user pressing a "first-used sheet" button 401, the CPU 10 sets the media automatic setting mode. Alternatively, by the user pressing a "change sheet type" button 402, the CPU 10 sets the media manual setting mode, and the user can explicitly sets the type of a sheet. The current sheet type setting is displayed in a display region 403, and because "automatic detection before printing" is set, it can be seen that the media automatic setting mode is currently set. In a case where the media manual setting mode is set, the type (for example, "plain paper") of a sheet selected by the user is displayed in the display region 403.

Hereinafter, a sheet conveyance method to be employed in a case where image formation is to be performed will be described with reference to FIGS. 5, 6, 7A, and 7B. FIGS. 5, 6, 7A, and 7B are diagrams illustrating a conveyance state of a sheet in the image forming apparatus 201 illustrated in FIG. 1, and the same components as those in FIG. 1 are assigned the same reference numerals. The following description will be given assuming that a feeding unit is limited to the manual feeding unit 235, but the same applies to the cassette sheet feeding unit 230.

Figure 5:
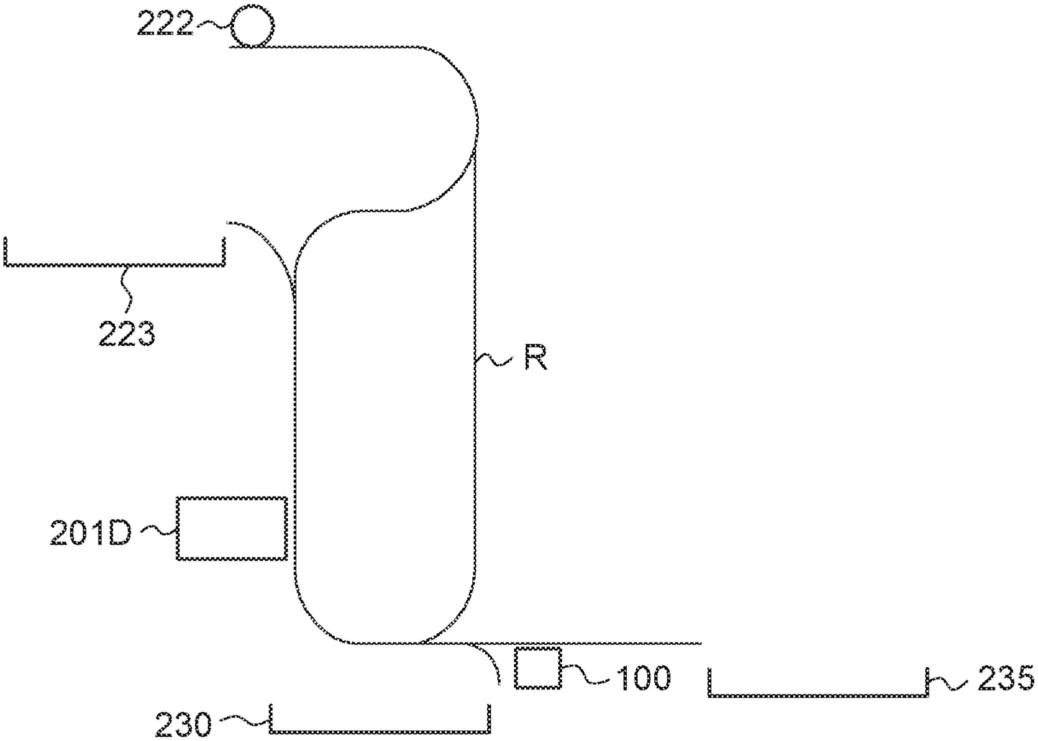
FIG. 5 is a diagram illustrating a conveyance path in a printer unit.
Figure 6:
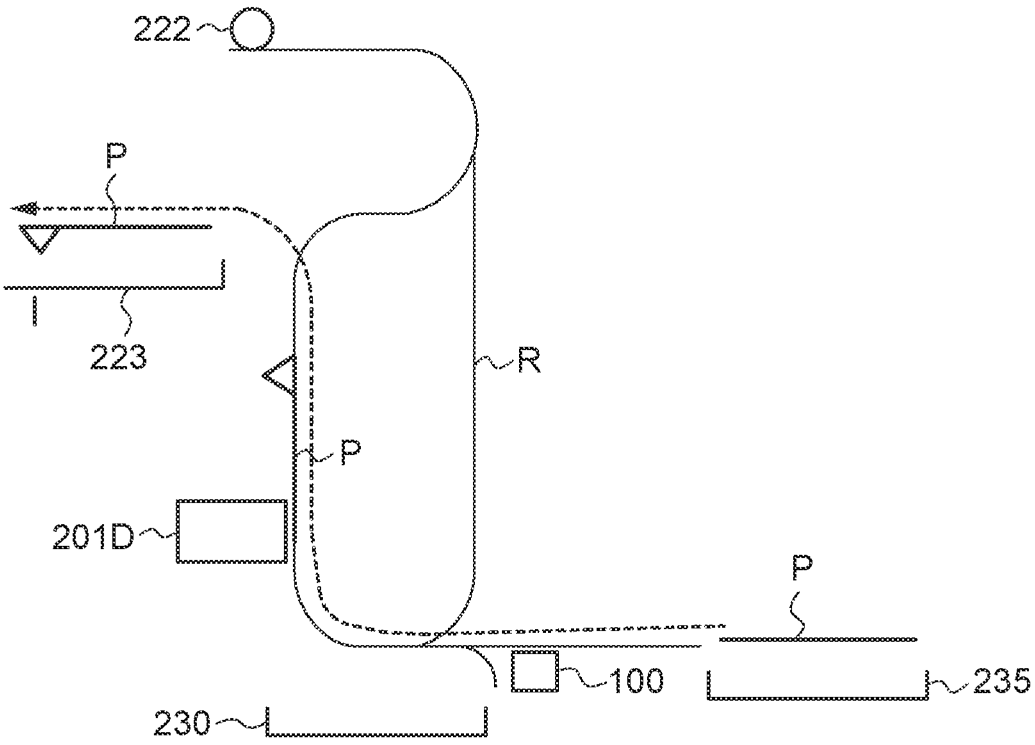
FIG. 6 is a diagram illustrating a conveyance state of a sheet conveyed in a case where simplex image formation is performed.

FIG. 5 illustrates a state in which a sheet is not conveyed on a conveyance path, and FIG. 6 illustrates a conveyance method of a sheet on which simplex image formation is to be performed. In a case where simplex image formation is to be performed, as illustrated in FIG. 6, the sheet P on which simplex image formation is to be performed is fed from the manual feeding unit 235, passes through a paper conveyance path, and is conveyed to the secondary transfer unit 201D. The sheet P on which an image has been transferred (a triangular object in FIG. 6 indicates the transferred image) is discharged to the stacking unit 223 via a conveyance path.

Figure 7A:
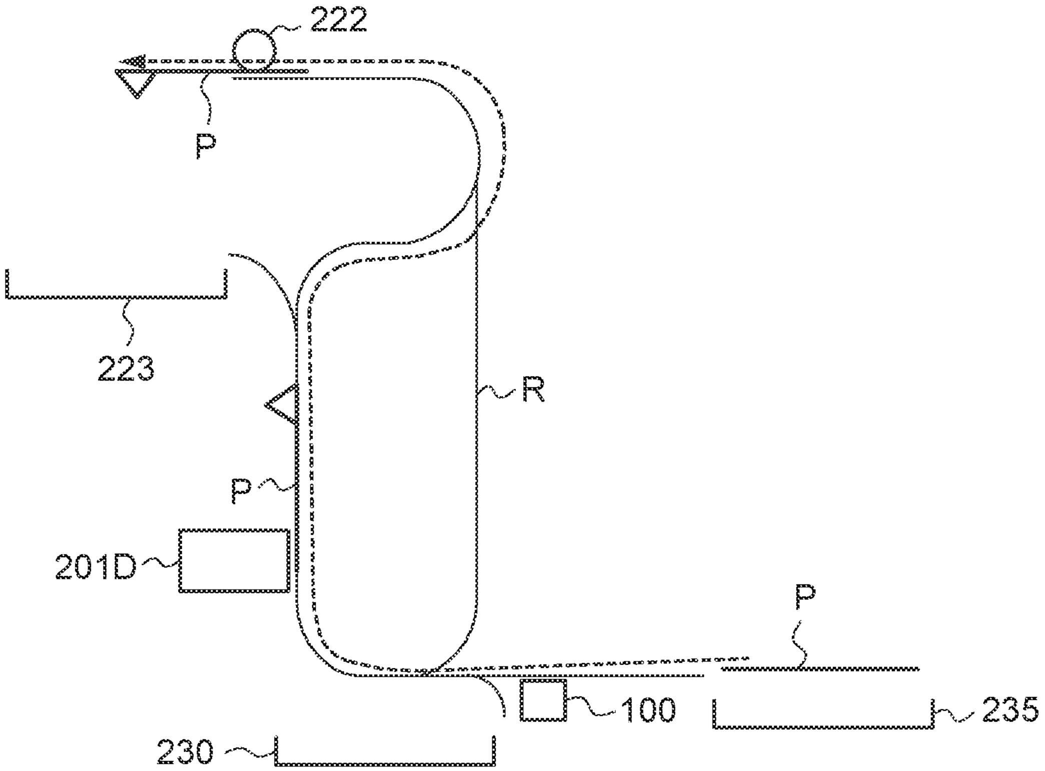
FIGS. 7A and 7B are diagrams each illustrating a conveyance state of a sheet conveyed in a case where duplex image formation is performed.
Figure 7B:
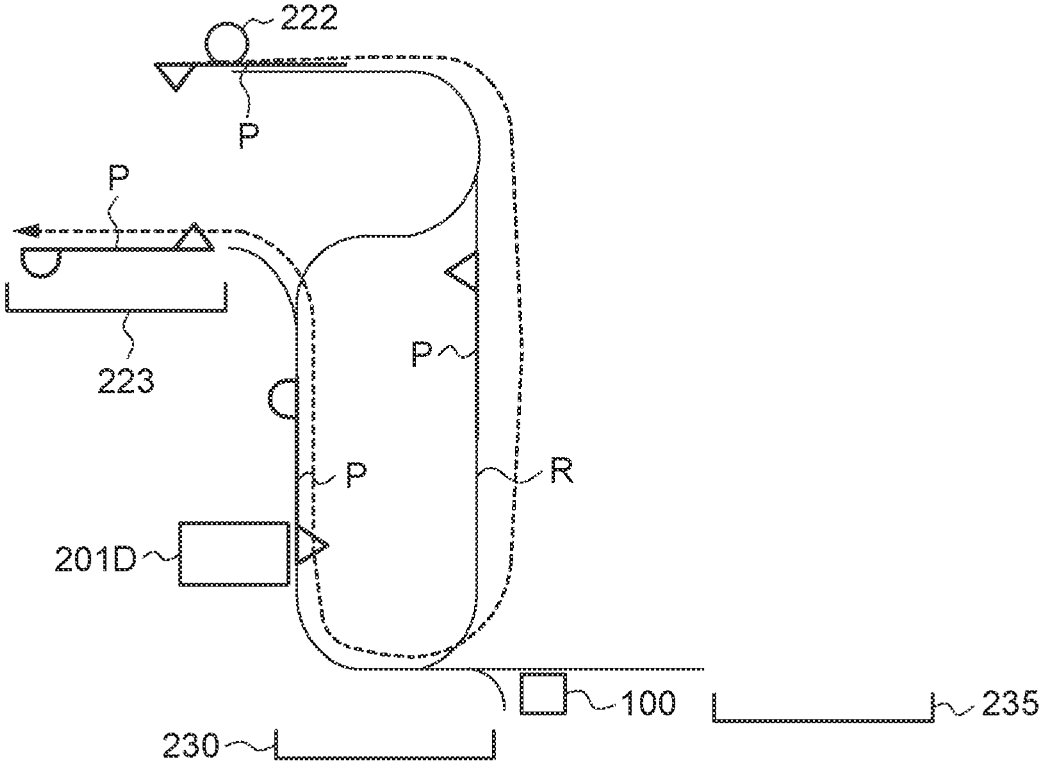

Hereinafter, a sheet conveyance method to be employed in a case where duplex image formation is to be performed will be described with reference to FIGS. 7A and 7B. FIGS. 7A and 7B are diagrams each illustrating a conveyance state of a sheet conveyed in a case where duplex image formation is to be performed in the image forming apparatus 201 illustrated in FIG. 1, and the same components as those in FIG. 1 are assigned the same reference numerals. The following description will be given assuming that a feeding unit is limited to the manual feeding unit 235, but the same applies to the cassette sheet feeding unit 230.

First of all, in a case where an image is formed onto a first surface of a sheet on which duplex image formation is to be performed, as illustrated in FIG. 7A, the sheet P on which duplex image formation is to be performed is fed from the manual feeding unit 235, passes through a paper conveyance path, and is conveyed to the secondary transfer unit 201D. The sheet P on which an image has been transferred (a triangular object in FIG. 7A indicates a first transferred surface image) is guided to the reversing roller pair 222.

Next, as illustrated in FIG. 7B, the sheet P on which the first surface image in duplex image formation has been transferred (a triangular object in FIG. 7B indicates the transferred first surface image) that exists at the reversing roller pair 222 is then refed to the reconveyance path R at a proper timing, and conveyed to the secondary transfer unit 201D. The sheet P for duplex image formation on which a second surface image has been transferred (a triangular object in FIG. 7B indicates the transferred first surface image, and a semiellipse in FIG. 7B indicates a second surface image) passes through the conveyance path and is discharged to the stacking unit 223.

Figure 8:
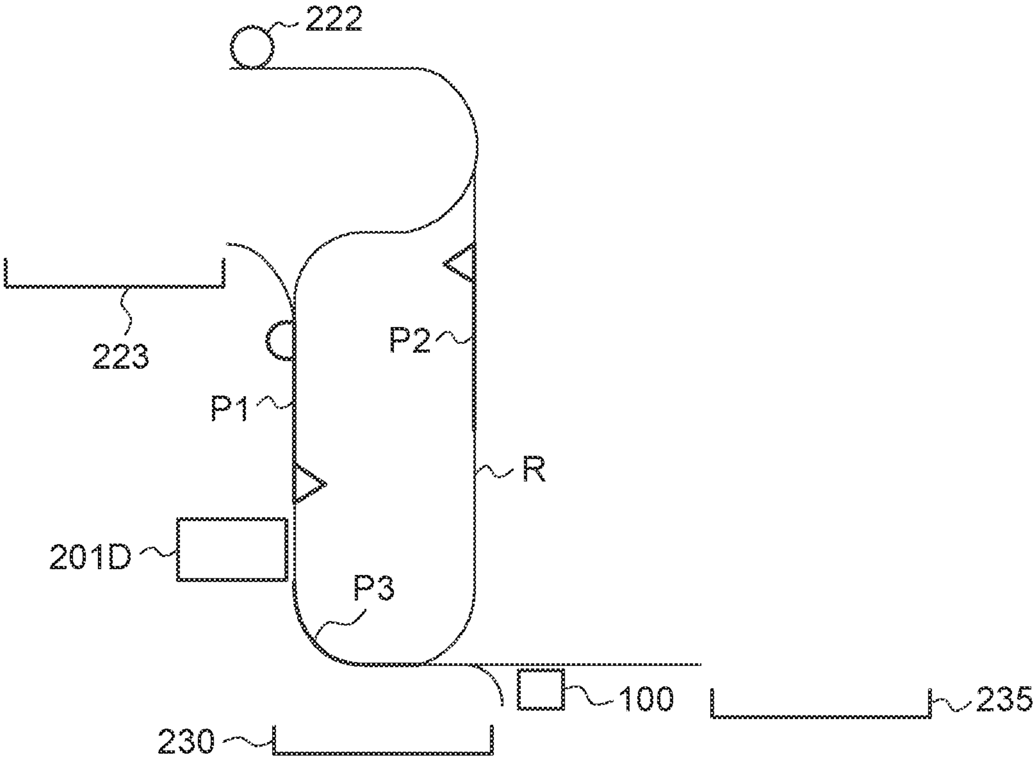
FIG. 8 is a diagram illustrating a conveyance state of a sheet conveyed in a case where duplex circulation image formation is performed.

Hereinafter, a sheet conveyance method to be employed in a case where circulation duplex image formation is to be performed will be described with reference to FIG. 8. FIG. 8 is a diagram illustrating a conveyance state of a sheet conveyed in a case where circulation duplex image formation is to be performed in the image forming apparatus 201 illustrated in FIG. 1, and the same components as those in FIG. 1 are assigned the same reference numerals. The following description will be given assuming that a feeding unit is limited to the manual feeding unit 235, but the same applies to the cassette sheet feeding unit 230. FIG. 8 illustrates a conveyance order of sheets existing on a paper conveyance path in a case where three sheets are circulated. In FIG. 8, sheets P1 to P3 indicate a conveyance order of the sheets existing on the paper conveyance path.

The manual feeding unit 235 is an example of a storage unit storing sheets. The secondary transfer unit 201D is a part of the image forming unit 201B illustrated in FIG. 1. The image forming unit 201B forms an image onto a sheet. The reconveyance path R is a conveyance path for reconveying the sheet P2 on which an image is formed by the image forming unit 201B on one side, to the image forming unit 201B to form an image on the other side of the sheet P2 on which the image is formed on the one side. The paper type detection sensor 100 is an example of a detection unit that is provided on a conveyance path between the manual feeding unit 235 and the image forming unit 201B, and detects the type of a sheet conveyed from the manual feeding unit 235.

Figure 9A:
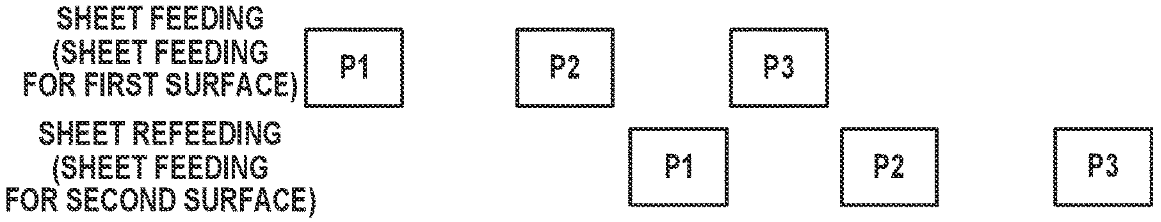
FIGS. 9A and 9B are diagrams illustrating a sheet feeding order in duplex circulation image formation.
Figure 9B:
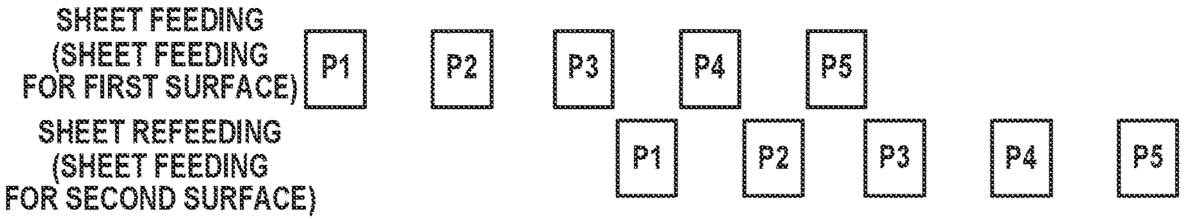

FIGS. 9A and 9B are diagrams illustrating a sheet feeding order of sheets in circulation image formation in the image forming apparatus 201 according to the present exemplary embodiment. FIG. 9A illustrates a sheet feeding order of sheets to be fed in a case where three sheets are circulated, and FIG. 9B illustrates a sheet feeding order of sheets to be fed in a case where five sheets are circulated. In FIGS. 9A and 9B, numbers P1 to P5 allocated to sheets indicate ordinal numbers of the sheets.

As illustrated in FIG. 9A, in a case where three-sheet circulation type image formation is to be performed as duplex image formation, after a first surface of a first-page sheet is fed, a first surface of a second-page sheet is next fed instead of refeeding a second surface of the first-page sheet. Then, the second surface of the first-page sheet fed earlier is next refed, and then, a first surface of a third-page sheet is fed. In this manner, refeeding of the second surface and feeding of the first surface are alternately continued.

As illustrated in FIG. 9B, in a case where five-sheet circulation type image formation is to be performed as duplex image formation, after the first surface of the first-page sheet is fed, the first surface of the second-page sheet is next fed instead of refeeding the second surface of the first-page sheet. Furthermore, the first surface of the third-page sheet is next fed instead of refeeding the second surface of the first-page sheet as in the three-sheet circulation. Then, the second surface of the first-page sheet fed earlier is next refed, and then, a first surface of a fourth-page sheet is fed. In this manner, refeeding of the second surface and feeding of the first surface are alternately continued.

The reason why the number of circulated sheets is changed to three or five in this manner is to efficiently perform duplex image formation using different sheet sizes on the same sheet path.

FIG. 10 is a diagram illustrating an example of a table for obtaining the number of circulated sheets and a conveyance speed from a sheet size and a sheet type in the image forming apparatus 201 according to the present exemplary embodiment. This table is stored in the ROM 11 of the control unit that controls the entire image forming apparatus 201, which is illustrated in FIG. 2.

The number of circulated sheets is basically determined based on a sheet size. For example, as illustrated in FIG. 10, in a case where a sheet size is "A4", the number of circulated sheets is "5", and in a case where a sheet size is "A3", the number of circulated sheets is "3".

A conveyance speed is determined based on a sheet type. For example, in a case where a sheet type is "plain paper", a conveyance speed becomes a constant speed. On the other hand, in a case where a sheet type is "thick paper", a conveyance speed becomes a half speed. This is to realize stable fixing by decreasing a conveyance speed to a half speed and causing a larger amount of heat to be conducted to a sheet, in a case where a sheet type is a sheet type with low heat conductivity like "thick paper", since a developer is fixed to a sheet by heat and pressure applied by the fixing unit 201E.

Referring to the table in FIG. 10, the CPU 10 determines a conveyance speed of a sheet in accordance with the type of the sheet, and determines the number of circulated sheets of the sheet in accordance with the size of the sheet. A conveyance speed of a sheet of which the sheet type is thick paper is slower than a conveyance speed of a sheet of which the sheet type is plain paper. The number of circulated sheets of a sheet of which the sheet size is a first size is smaller than the number of circulated sheets of a sheet of which the sheet size is a second size smaller than the first size.

In a case where a size of a sheet is the first size, the number of circulated sheets of the sheet is three, and in a case where a size of a sheet is the second size, the number of circulated sheets of the sheet is five. For example, the first size is an A3 size and the second size is an A4 size.

Figure 11A:
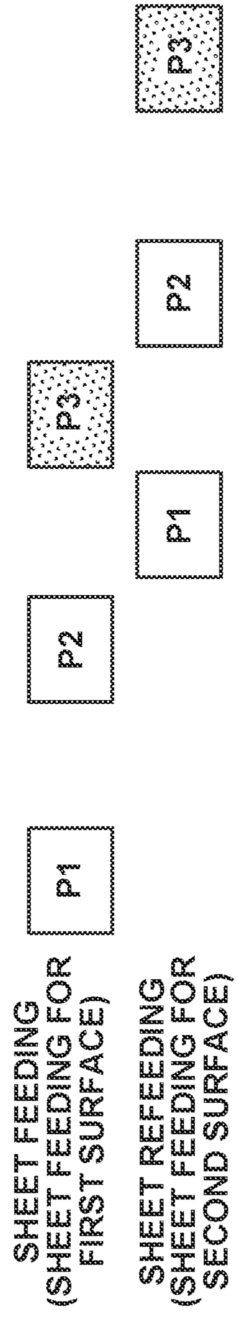
FIGS. 11A and 11B are diagrams illustrating a sheet feeding order of sheets to be fed when duplex circulation printing is stopped.
Figure 11B:
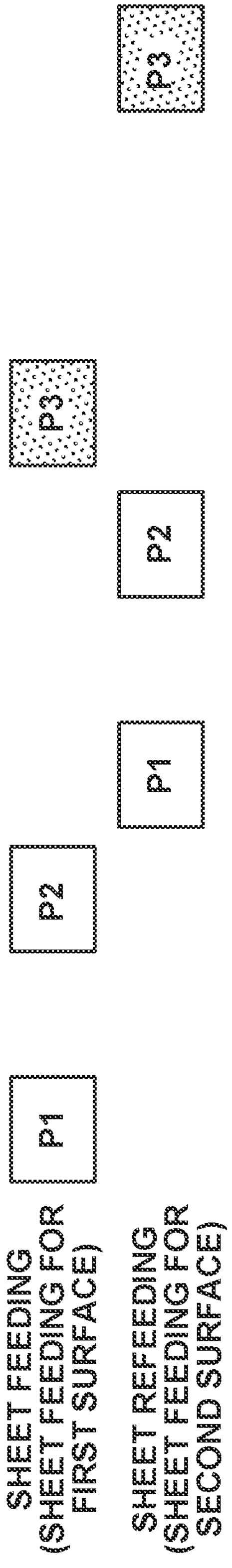

FIGS. 11A and 11B are diagrams illustrating a sheet feeding order of sheets to be fed when duplex circulation printing is stopped in duplex circulation image formation. Among three sheets in total, pieces of plain paper are fed from the cassette sheet feeding unit 230 as first-page and second-page sheets, and thick paper is fed from the manual feeding unit 235 as a third-page sheet, and duplex image formation is performed thereon.

As illustrated in FIG. 11A, if duplex circulation printing on the pieces of plain paper fed as the first-page and second-page sheets and the thick paper fed as the third-page sheet is continued without stop, a conveyance speed is switched in such a manner that a conveyance speed of the second surface of the first-page sheet becomes a constant speed, a conveyance speed of the first surface of the third-page sheet becomes a half speed, and a conveyance speed of the second surface of the second-page sheet becomes a constant speed. Nevertheless, it is impossible to convey different sheets concurrently existing in the image forming apparatus 201, at different conveyance speeds. There is a risk that a sheet conveyed at a constant speed collides with a sheet conveyed at a half speed, and a jam occurs. In a case where rollers on a conveyance path are controlled by the same motor, it is fundamentally impossible to convey sheets at different conveyance speeds.

For this reason, in a case where duplex printing is to be performed on sheets with different conveyance speeds, duplex circulation printing needs to be stopped as illustrated in FIG. 11B. More specifically, after duplex circulation processing on pieces of plain paper fed as the first-page sheet and the second-page sheet is once completed, duplex circulation control of thick paper fed as the third-page sheet is to be executed.

Figure 12:
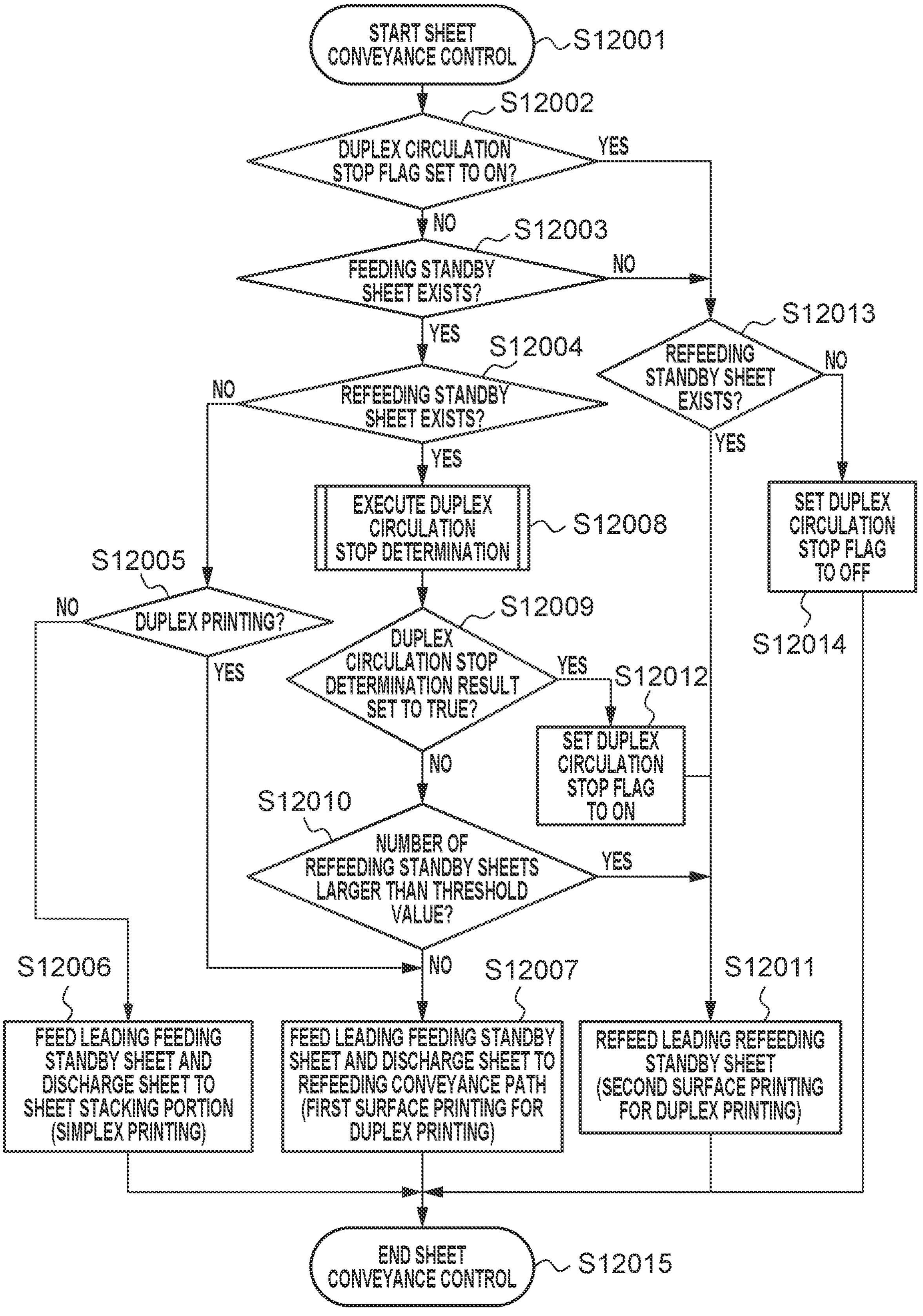
FIG. 12 is a flowchart illustrating sheet conveyance control.

FIG. 12 is a flowchart illustrating a control method of the image forming apparatus 201 according to the present exemplary embodiment, and illustrates sheet conveyance control. The CPU 10 is an example of a control unit. In step S12001, the CPU 10 starts sheet conveyance control.

In step S12002, the CPU 10 determines whether a duplex circulation stop flag on the RAM 12 is set to on. In a case where the duplex circulation stop flag is set to on (YES in step S12002), the processing proceeds to step S12013. In a case where the duplex circulation stop flag is set to off (NO in step S12002), the processing proceeds to step S12003.

In step S12003, the CPU 10 determines whether a feeding standby sheet exists. The feeding standby sheet is a sheet waiting to be fed from the manual feeding unit 235 to the secondary transfer unit 201D for first surface printing. In a case where the feeding standby sheet exists (YES in step S12003), the processing proceeds to step S12004. In a case where the feeding standby sheet does not exist (NO in step S12003), the processing proceeds to step S12013.

In step S12004, the CPU 10 determines whether a refeeding standby sheet exists. The refeeding standby sheet is a sheet waiting to be fed from the reversing roller pair 222 to the secondary transfer unit 201D via the reconveyance path R for second surface printing. In a case where the refeeding standby sheet does not exist (NO in step S12004), the processing proceeds to step S12005. In a case where the refeeding standby sheet exists (YES in step S12004), the processing proceeds to step S12008.

In step S12005, the CPU 10 determines whether a leading feeding standby sheet is set to duplex printing. In a case where the leading feeding standby sheet is set to simplex printing (NO in step S12005), the processing proceeds to step S12006. In a case where the leading feeding standby sheet is set to duplex printing (YES in step S12005), the processing proceeds to step S12007.

In step S12006, the CPU 10 causes the image forming unit 201B to form an image on one side of a leading feeding standby sheet on the manual feeding unit 235 for simplex printing, and discharges the sheet to the stacking unit (discharge tray) 223. After that, in step S12015, the CPU 10 ends the sheet conveyance control.

In step S12007, the CPU 10 causes the image forming unit 201B to form an image on one side of a leading feeding standby sheet on the manual feeding unit 235 for the first surface printing in duplex printing, and discharges the sheet to the reversing roller pair 222. After that, in step S12015, the CPU 10 ends the sheet conveyance control.

In step S12008, the CPU 10 performs duplex circulation stop determination processing. The details of the duplex stop determination processing will be described below with reference to FIG. 13. After that, the processing proceeds to step S12009.

In step S12009, the CPU 10 determines whether a result of the duplex circulation stop determination processing in step S12008 is set to TRUE. In a case where a result of the duplex circulation stop determination processing is set to FALSE (NO in step S12009), the processing proceeds to step S12010. In a case where a result of the duplex circulation stop determination processing is set to TRUE (YES in step S12009), the processing proceeds to step S12012.

In step S12010, the CPU 10 determines whether the number of refeeding standby sheets is larger than a threshold value. The threshold value is (the number of circulated sheets-1)/2, for example. The number of circulated sheets is determined based on the table illustrated in FIG. 10. For example, in a case where a sheet size is "A3" and a sheet type is "plain paper", based on the table illustrated in FIG. 10, the number of circulated sheets becomes "3". In this case, the threshold value becomes (3−1)/2=1. In a case where the number of refeeding standby sheets is not larger than the threshold value (NO in step S12010), the processing proceeds to step S12007. In a case where the number of refeeding standby sheets is larger than the threshold value (YES in step S12010), the processing proceeds to step S12011.

In step S12011, the CPU 10 causes the image forming unit 201B to form an image on the other side of a leading refeeding standby sheet on the reconveyance path R for the second surface printing in duplex printing, and discharges the sheet to the stacking unit 223. After that, in step S12015, the CPU 10 ends the sheet conveyance control.

In step S12012, the CPU 10 sets a duplex circulation stop flag on the RAM 12 to on. After that, the processing proceeds to step S12011.

In step S12013, the CPU 10 determines whether a refeeding standby sheet exists. In a case where the refeeding standby sheet exists (YES in step S12013), the processing proceeds to step S12011. In a case where the refeeding standby sheet does not exist (NO in step S12013), the processing proceeds to step S12014.

In step S12014, the CPU 10 sets a duplex circulation stop flag on the RAM 12 to off. After that, in step S12015, the CPU 10 ends the sheet conveyance control.

Figure 13:
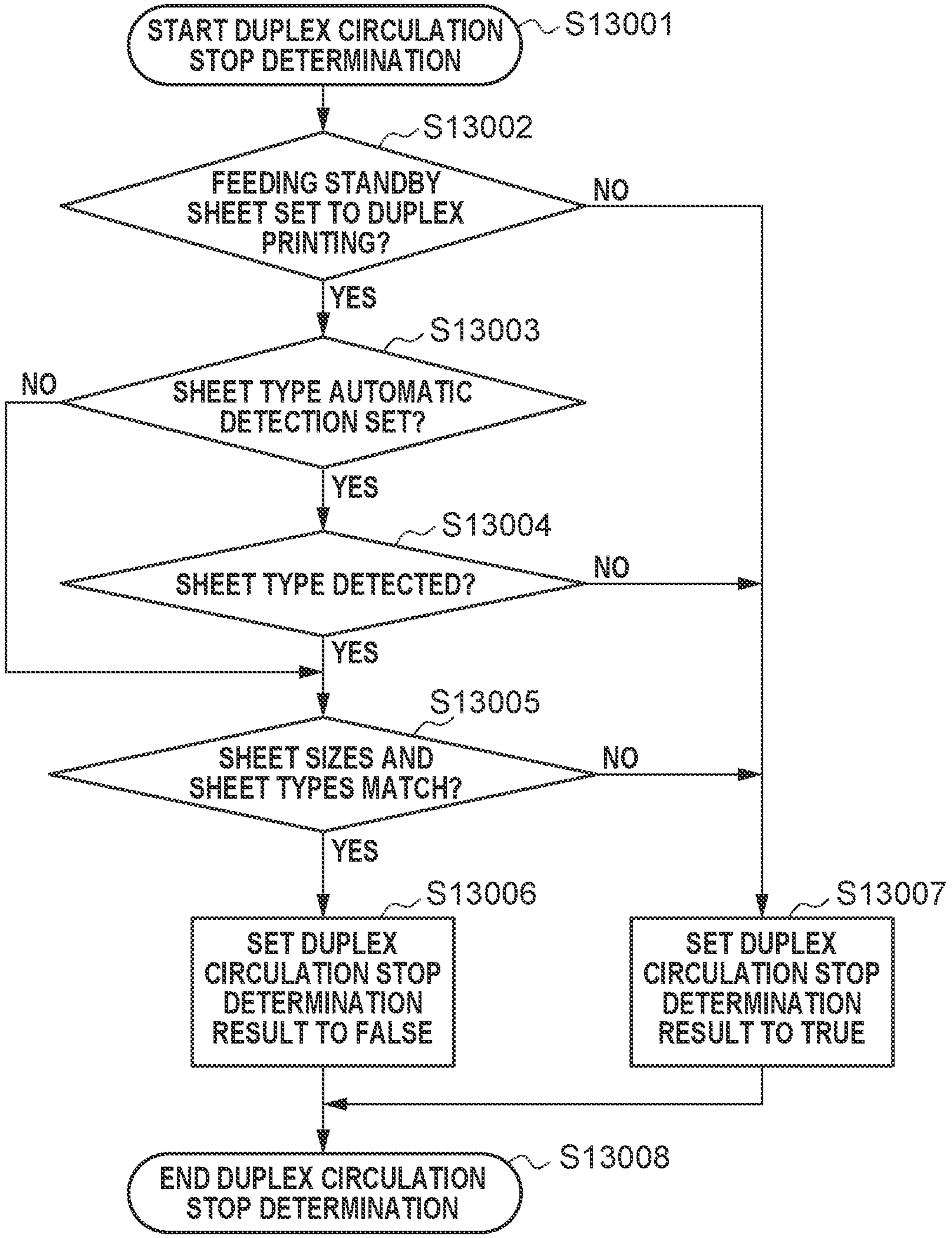
FIG. 13 is a flowchart illustrating duplex circulation stop determination processing.

FIG. 13 is a flowchart illustrating the details of the duplex circulation stop determination processing in step S12008 of FIG. 12. In step S13001, the CPU 10 starts the duplex circulation stop determination processing. After that, the processing proceeds to step S13002.

In step S13002, the CPU 10 determines whether a feeding standby sheet is set to duplex printing. In a case where the feeding standby sheet is set to simplex printing (NO in step S13002), the processing proceeds to step S13007. In a case where the feeding standby sheet is set to duplex printing (YES in step S13002), the processing proceeds to step S13003.

In step S13003, the CPU 10 determines whether a source feeding unit of the feeding standby sheet is set as a feeding unit that automatically detects a sheet type. In a case where a source feeding unit of the feeding standby sheet is the cassette sheet feeding unit 230, the CPU 10 determines that a source feeding unit of the feeding standby sheet is not set as a feeding unit that automatically detects a sheet type. In a case where a source feeding unit of the feeding standby sheet is the manual feeding unit 235, and the manual feeding unit 235 is set to the media manual setting mode, the CPU 10 determines that a source feeding unit of the feeding standby sheet is not set as a feeding unit that automatically detects a sheet type. In a case where a source feeding unit of the feeding standby sheet is the manual feeding unit 235, and the manual feeding unit 235 is set to the media automatic setting mode, the CPU 10 determines that a source feeding unit of the feeding standby sheet is set as a feeding unit that automatically detects a sheet type.

The media manual setting mode is set by the press of the "change sheet type" button 402 illustrated in FIG. 4. The media automatic setting mode is set by the press of the "first-used sheet" button 401 illustrated in FIG. 4. In a case where a source feeding unit of the feeding standby sheet is set as a feeding unit that automatically detects a sheet type (YES in step S13003), the processing proceeds to step S13004. In a case where a source feeding unit of the feeding standby sheet is not set as a feeding unit that automatically detects a sheet type (NO in step S13003), the processing proceeds to step S13005.

In step S13004, the CPU 10 determines whether the type of a feeding standby sheet on a feeding unit has been detected using the media sensor 14. The type of sheets in a bundle of paper stacked on the manual feeding unit 235 can be regarded as being the same in the bundle of paper instead of varying one by one. Thus, in a case where the user has stacked a bundle of paper on the manual feeding unit 235 on which a bundle of paper does not exist, the media sensor 14 is only required to detect the type of just a leading sheet of the bundle of paper. The CPU 10 assumes that the types of all sheets in the bundle of paper are the same. The CPU 10 detects the type of the leading sheet in a bundle of paper stored on the manual feeding unit 235, using the media sensor 14, and assumes that the types of second-page and subsequent sheets in the bundle of paper are the same as the type of the leading sheet.

Thus, in a case where a feeding standby sheet on the manual feeding unit 235 is not the leading sheet in the bundle of paper, the CPU 10 determines that the type of a feeding standby sheet on a feeding unit has been detected. In a case where a feeding standby sheet on the manual feeding unit 235 is a leading sheet in the bundle of paper, the CPU 10 determines that the type of a feeding standby sheet on a feeding unit has not been detected. In a case where a sheet type has been detected (YES in step S13004), the processing proceeds to step S13005. In a case where a sheet type has not been detected (NO in step S13004), the processing proceeds to step S13007.

In step S13005, the CPU 10 determines whether the size and the type of the feeding standby sheet and the size and the type of the refeeding standby sheet match each other. In a case where the sizes and the types of both the sheets are different, because the numbers of circulated sheets and conveyance speeds in FIG. 10 are different, duplex circulation printing cannot be continued. In a case where the sizes and the types of both the sheets match (YES in step S13005), to continue the duplex circulation printing, the processing proceeds to step S13006. In a case where the sizes and the types of both the sheets do not match (NO in step S13005), to stop the duplex circulation printing, the processing proceeds to step S13007.

In step S13006, the CPU 10 sets a result of the duplex circulation stop determination processing to FALSE. After that, in step S13008, the CPU 10 ends the duplex circulation stop determination processing.

In step S13007, the CPU 10 sets a result of the duplex circulation stop determination processing to TRUE. After that, in step S13008, the CPU 10 ends the duplex circulation stop determination processing.

Next, the description will be given of a case where the number of circulated sheets is three, and the sizes and the types of the three sheets P1 to P3 are all the same, as illustrated in FIG. 9A. In this case, the CPU 10 causes the image forming unit 201B to form an image on one side of the first-page sheet P1 on the manual feeding unit 235. After that, the CPU 10 causes the image forming unit 201B to form an image on one side of the second-page sheet P2 on the manual feeding unit 235. After that, the CPU 10 causes the image forming unit 201B to form an image on the other side of the first-page sheet P1 on the reconveyance path R. After that, the CPU 10 causes the image forming unit 201B to form an image on one side of the third-page sheet P3 on the manual feeding unit 235. After that, the CPU 10 causes the image forming unit 201B to form an image on the other side of the second-page sheet P2 on the reconveyance path R. After that, the CPU 10 causes the image forming unit 201B to form an image on the other side of the third-page sheet P3 on the reconveyance path R.

Next, the description will be given of a case where the number of circulated sheets is three, and the sizes and the types of the sheets P1 and P2 are the same, and the sizes and the types of the sheets P2 and P3 are not the same, as illustrated in FIG. 11B. In this case, the CPU 10 causes the image forming unit 201B to form an image on one side of the first-page sheet P1 on the manual feeding unit 235. After that, the CPU 10 causes the image forming unit 201B to form an image on one side of the second-page sheet P2 on the manual feeding unit 235. After that, the CPU 10 causes the image forming unit 201B to form an image on the other side of the first-page sheet P1 on the reconveyance path R. After that, the CPU 10 causes the image forming unit 201B to form an image on the other side of the second-page sheet P2 on the reconveyance path R. After that, the CPU 10 causes the image forming unit 201B to form an image on one side of the third-page sheet P3 on the manual feeding unit 235. After that, the CPU 10 causes the image forming unit 201B to form an image on the other side of the third-page sheet P3 on the reconveyance path R.

Next, the description will be given of a case where the number of circulated sheets is five, and the sizes and the types of the five sheets P1 to P5 are all the same, as illustrated in FIG. 9B. In this case, the CPU 10 causes the image forming unit 201B to form an image on one side of the first-page sheet P1 on the manual feeding unit 235. After that, the CPU 10 causes the image forming unit 201B to form an image on one side of the second-page sheet P2 on the manual feeding unit 235. After that, the CPU 10 causes the image forming unit 201B to form an image on one side of the third-page sheet P3 on the manual feeding unit 235. After that, the CPU 10 causes the image forming unit 201B to form an image on the other side of the first-page sheet P1 on the reconveyance path R. After that, the CPU 10 causes the image forming unit 201B to form an image on one side of the fourth-page sheet P4 on the manual feeding unit 235. After that, the CPU 10 causes the image forming unit 201B to form an image on the other side of the second-page sheet P2 on the reconveyance path R. After that, the CPU 10 causes the image forming unit 201B to form an image on one side of the fifth-page sheet P5 on the manual feeding unit 235. After that, the CPU 10 causes the image forming unit 201B to form an image on the other side of the third-page sheet P3 on the reconveyance path R. After that, the CPU 10 causes the image forming unit 201B to form an image on the other side of the fourth-page sheet P4 on the reconveyance path R. After that, the CPU 10 causes the image forming unit 201B to form an image on the other side of the fifth-page sheet P5 on the reconveyance path R.

Next, the description will be given of a case where the number of circulated sheets is five, and the sizes and the types of the sheets P1 to P3 are all the same and the sizes and the types of the sheets P2 and P4 are not the same in FIG. 9B. In this case, the CPU 10 causes the image forming unit 201B to form an image on one side of the first-page sheet P1 on the manual feeding unit 235. After that, the CPU 10 causes the image forming unit 201B to form an image on one side of the second-page sheet P2 on the manual feeding unit 235. After that, the CPU 10 causes the image forming unit 201B to form an image on one side of the third-page sheet P3 on the manual feeding unit 235. After that, the CPU 10 causes the image forming unit 201B to form an image on the other side of the first-page sheet P1 on the reconveyance path R. After that, the CPU 10 causes the image forming unit 201B to form an image on the other side of the second-page sheet P2 on the reconveyance path R. After that, the CPU 10 causes the image forming unit 201B to form an image on the other side of the third-page sheet P3 on the reconveyance path R. After that, the CPU 10 causes the image forming unit 201B to form an image on one side of the fourth-page sheet P4 on the manual feeding unit 235.

As described above, according to the present exemplary embodiment, the CPU 10 detects the type of a sheet using the media sensor 14 positioned on a sheet conveyance path. In a sheet-unfed state in which a sheet has not reached the media sensor 14, the media sensor 14 cannot detect the type of the sheet. If the type of the sheet is not detected, the CPU 10 cannot determine a conveyance speed of the sheet and cannot determine whether duplex circulation printing may be continued. If the CPU 10 continues duplex circulation printing without determination, a jam sometimes occurs, and an issue in usability arises. In view of the foregoing, the CPU 10 detects the type of a leading sheet in a bundle of paper using the media sensor 14, and assumes that the sheet types of the second-page and subsequent sheets in the bundle of paper are the same as the sheet type of the leading sheet.

The CPU 10 detects the type of a sheet using the media sensor 14 positioned on a sheet conveyance path, and determines a conveyance speed in accordance with the type of the sheet. In a case where the sizes and the types of a feeding standby sheet and a refeeding standby sheet match each other, the CPU 10 continues duplex circulation printing. In a case where the sizes and the types of a feeding standby sheet and a refeeding standby sheet do not match each other, the CPU 10 stops duplex circulation printing. By stopping duplex circulation printing, it becomes possible to perform appropriate print control without causing a jam. The image forming apparatus 201 accordingly becomes able to provide a printed product to the user without deteriorating performance more than necessary.

A second exemplary embodiment will be described with reference to FIGS. 14A, 14B and 15. In the first exemplary embodiment, the CPU 10 controls duplex circulation printing to be stopped in a case where a result of the duplex circulation stop determination processing in FIG. 13 is set to TRUE. Nevertheless, even in a case where a result of the duplex circulation stop determination processing in FIG. 13 is set to TRUE, duplex circulation printing can be continued in some cases. In the second exemplary embodiment, such cases will be described.

Figure 14A:
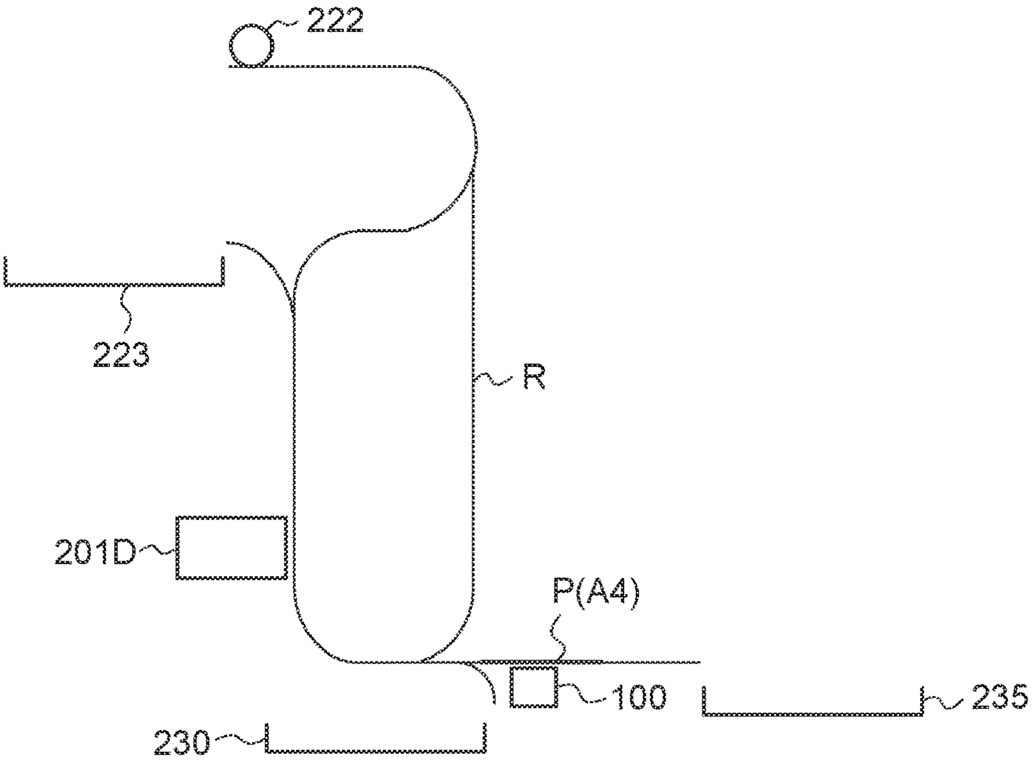
FIGS. 14A and 14B are diagrams each illustrating a sheet on a conveyance path that is conveyed during paper type determination executed by the media sensor.
Figure 14B:
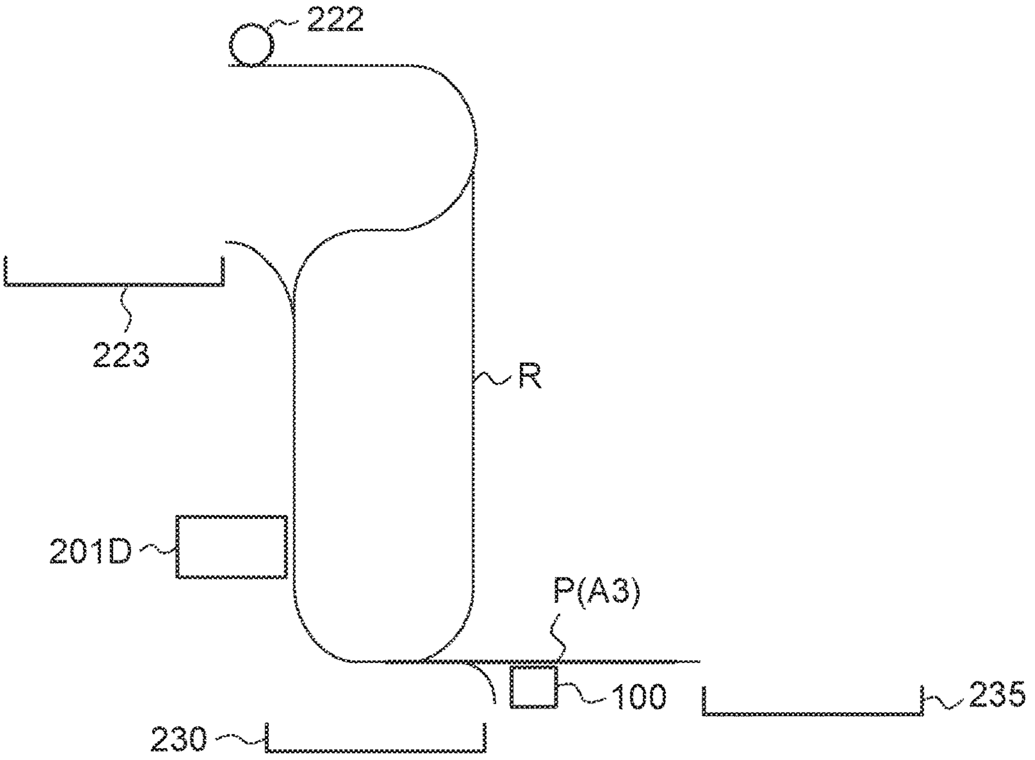

FIGS. 14A and 14B are diagrams each illustrating a state in which a sheet is suspended to detect the type of the sheet by the paper type detection sensor 100. The paper type detection sensor 100 is equivalent to the media sensor 14.

For example, as illustrated in FIG. 14A, in a case where the sheet P is a sheet P with a short sheet length, such as an A4-sized sheet P, for example, the sheet P can be suspended at a position at which the sheet P does not disturb conveyance from the reconveyance path R and conveyance from the cassette sheet feeding unit 230.

On the other hand, as illustrated in FIG. 14B, in a case where the sheet P is a sheet P with a long sheet length, such as an A3-sized sheet P, for example, the sheet P is suspended at a position at which the sheet P disturbs conveyance from the reconveyance path R and conveyance from the cassette sheet feeding unit 230. Because a refeeding standby sheet existing on the reconveyance path R cannot be conveyed in this state, there is no other way but to continue duplex circulation printing by conveying, with no exception, a sheet of which the sheet type has been detected by the paper type detection sensor 100. Nevertheless, in a case where the sheet type detected by the paper type detection sensor 100 is a sheet type that disables the continuance of duplex circulation printing, a contradiction arises and a failure occurs. Thus, in a case where the sheet P has a sheet size that disturbs conveyance from the reconveyance path R, it is necessary to perform the detection of a sheet type by the paper type detection sensor 100 after duplex circulation printing is stopped.

As illustrated in FIG. 14A, in a case where the sheet P is a sheet P with a short sheet length, such as an A4-sized sheet P, for example, the sheet P does not disturb conveyance from the reconveyance path R. Thus, the CPU 10 executes the detection of a sheet type by the paper type detection sensor 100, and as a result of sheet type detection, in a case where a conveyance speed of a feeding standby sheet and a conveyance speed of a refeeding standby sheet match, the CPU 10 can continue duplex circulation printing without stop.

Figure 15:
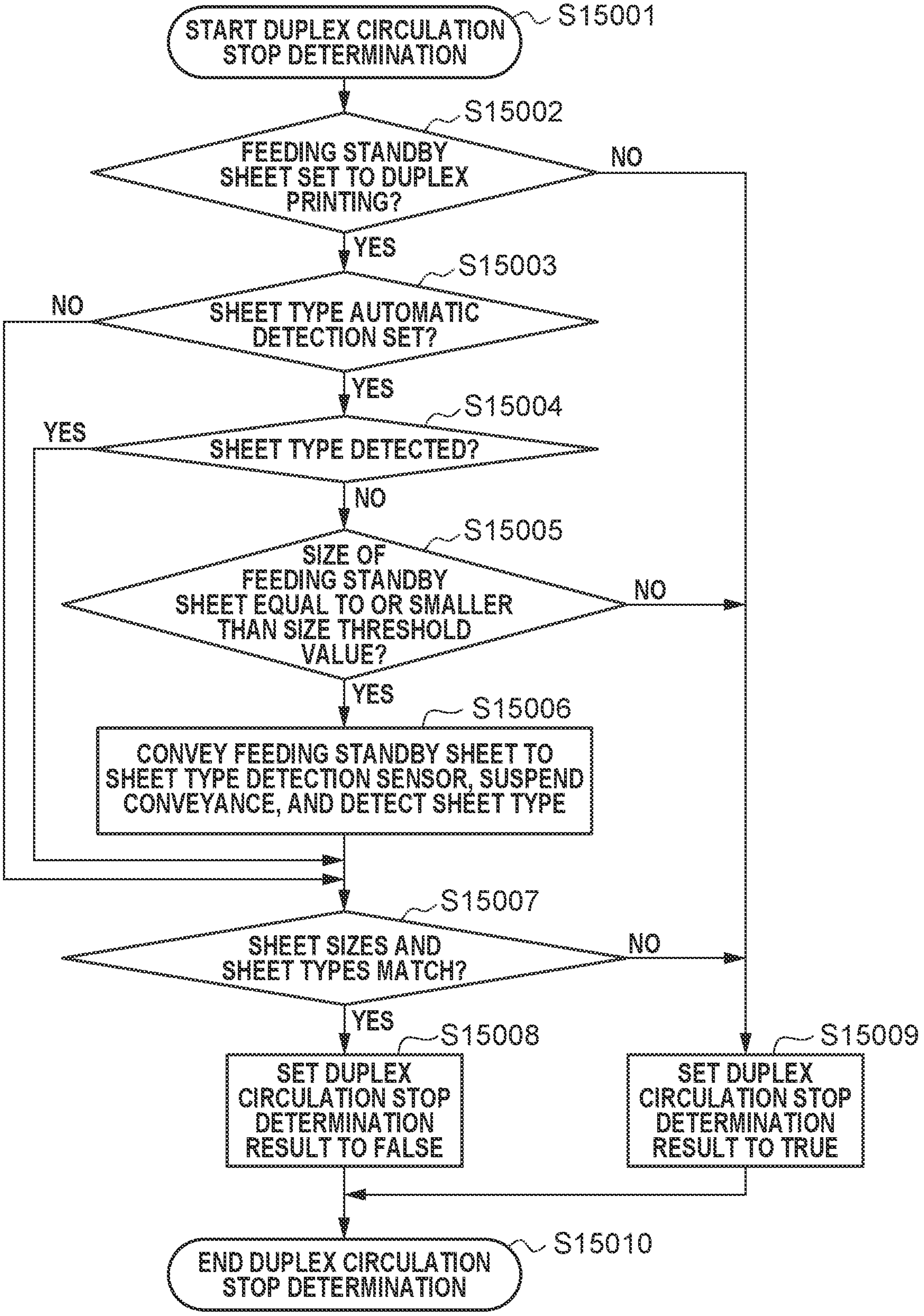
FIG. 15 is a flowchart illustrating duplex circulation stop determination processing.

FIG. 15 is a flowchart illustrating the details of the duplex circulation stop determination processing according to the second exemplary embodiment in step S12008 of FIG. 12. In step S15001, the CPU 10 starts the duplex circulation stop determination processing. After that, the processing proceeds to step S15002.

In step S15002, similarly to step S13002 of FIG. 13, the CPU 10 determines whether a feeding standby sheet is set to duplex printing. In a case where the feeding standby sheet is set to simplex printing (NO in step S15002), the processing proceeds to step S15009. In a case where the feeding standby sheet is set to duplex printing (YES in step S15002), the processing proceeds to step S15003.

In step S15003, similarly to step S13003 of FIG. 13, the CPU 10 determines whether a source feeding unit of the feeding standby sheet is set as a feeding unit that automatically detects a sheet type. In a case where a source feeding unit of the feeding standby sheet is set as a feeding unit that automatically detects a sheet type (YES in step S15003), the processing proceeds to step S15004. In a case where a source feeding unit of the feeding standby sheet is not set as a feeding unit that automatically detects a sheet type (NO in step S15003), the processing proceeds to step S15007.

In step S15004, similarly to step S13004 of FIG. 13, the CPU 10 determines whether the type of a feeding standby sheet on a feeding unit has been detected using the paper type detection sensor 100. In a case where a feeding standby sheet on the manual feeding unit 235 is not a leading sheet in a bundle of paper, the CPU 10 determines that the type of a feeding standby sheet on a feeding unit has been detected. In a case where a feeding standby sheet on the manual feeding unit 235 is a leading sheet in the bundle of paper, the CPU 10 determines that the type of a feeding standby sheet on a feeding unit has not been detected. In a case where a sheet type has been detected (YES in step S15004), the processing proceeds to step S15007. In a case where a sheet type has not been detected (NO in step S15004), the processing proceeds to step S15005.

In step S15005, the CPU 10 determines whether a size of the feeding standby sheet is equal to or smaller than a size threshold value. The size threshold value is the largest value of the size of the feeding standby sheet that does not disturb the conveyance of a refeeding standby sheet even if the feeding standby sheet is conveyed up to the paper type detection sensor 100. For example, the size threshold value is an A4 size. In a case where the size of the feeding standby sheet is equal to or smaller than the size threshold value (YES in step S15005), the processing proceeds to step S15006. In a case where the size of the feeding standby sheet is not equal to or smaller than the size threshold value (NO in step S15005), the processing proceeds to step S15009.

In step S15006, the CPU 10 conveys the feeding standby sheet from the manual feeding unit 235 up to the position of the paper type detection sensor 100, and then suspends the conveyance of the sheet, and causes the paper type detection sensor 100 to detect the type of the sheet. After that, the processing proceeds to step S15007.

In step S15007, similarly to step S13005 of FIG. 13, the CPU 10 determines whether the size and the type of the feeding standby sheet and the size and the type of the refeeding standby sheet match each other. In a case where the sizes and the types of both the sheets are different, because the numbers of circulated sheets and conveyance speeds in FIG. 10 are different, duplex circulation printing cannot be continued. In a case where the sizes and the types of both the sheets match (YES in step S15007), to continue the duplex circulation printing, the processing proceeds to step S15008.

In a case where the sizes and the types of both the sheets do not match (NO in step S15007), to stop the duplex circulation printing, the processing proceeds to step S15009.

In step S15008, the CPU 10 sets a result of the duplex circulation stop determination processing to FALSE. After that, in step S15010, the CPU 10 ends the duplex circulation stop determination processing.

In step S15009, the CPU 10 sets a result of the duplex circulation stop determination processing to TRUE. After that, in step S15010, the CPU 10 ends the duplex circulation stop determination processing.

As described above, according to the present exemplary embodiment, in a case where a size of a leading sheet on a feeding unit is equal to or smaller than a size threshold value, the CPU 10 detects the type of the leading sheet and continues duplex circulation printing. In a case where a size of a leading sheet on a feeding unit is not equal to or smaller than a size threshold value, the CPU 10 stops duplex circulation printing. It accordingly becomes possible to provide a printed product to the user without deteriorating performance more than necessary, while preventing the occurrence of a jam.

Each of the above-described exemplary embodiments merely indicates a specific example in carrying out the present disclosure, and the technical scope of the present disclosure is not construed in a limited manner based on these exemplary embodiments. In other words, the present disclosure can be executed in various forms without departing from the technical idea thereof or a major feature thereof.

The disclosure of the present exemplary embodiment includes the following configurations and methods.

(Configuration 1)

An image forming apparatus comprising:

a storage unit configured to store a sheet;

an image forming unit configured to form an image onto the sheet;

a reconveyance path for reconveying a sheet on which an image is formed by the image forming unit on one side, to the image forming unit to form an image on another side of the sheet on which the image is formed on the one side;

a detection unit that is provided on a conveyance path between the storage unit and the image forming unit, and configured to detect a type of a sheet conveyed from the storage unit; and a control unit configured to cause the image forming unit to form an image on one side of a first sheet on the storage unit, then cause the image forming unit to form an image on one side of a second sheet on the storage unit, and then cause the image forming unit to form an image on another side of the first sheet on the reconveyance path, in which, in a case where a type of a third sheet on the storage unit and a type of the second sheet on the reconveyance path are the same, after the control unit causes the image forming unit to form an image on another side of the first sheet, the control unit causes the image forming unit to form an image on one side of the third sheet on the storage unit, and then causes the image forming unit to form an image on another side of the second sheet on the reconveyance path, and in which, in a case where a type of the third sheet on the storage unit and a type of the second sheet on the reconveyance path are not the same, after the control unit causes the image forming unit to form an image on another side of the first sheet, the control unit causes the image forming unit to form an image on another side of the second sheet on the reconveyance path, and then causes the image forming unit to form an image on one side of the third sheet on the storage unit.

(Configuration 2)

The image forming apparatus according to Configuration 1, in which the control unit causes the detection unit to detect a type of a leading sheet in a bundle of paper stored in the storage unit, and assumes that types of second-page and subsequent sheets in the bundle of paper are the same as the type of the leading sheet.

(Configuration 3)

The image forming apparatus according to Configuration 1 or 2, in which the control unit determines a conveyance speed of the sheet in accordance with a type of the sheet.

(Configuration 4)

The image forming apparatus according to Configuration 3, in which a conveyance speed of a sheet of which the type of the sheet is thick paper is slower than a conveyance speed of a sheet of which the type of the sheet is plain paper.

(Configuration 5)

The image forming apparatus according to any one of Configurations 1 to 4, in which, in a case where a size and a type of the third sheet on the storage unit and a size and a type of the second sheet on the reconveyance path are the same, the control unit causes the image forming unit to form an image on one side of the third sheet on the storage unit, and then causes the image forming unit to form an image on another side of the second sheet on the reconveyance path, and in which, in a case where a size and a type of the third sheet on the storage unit and a size and a type of the second sheet on the reconveyance path are not the same, the control unit causes the image forming unit to form an image on another side of the second sheet on the reconveyance path, and then causes the image forming unit to form an image on one side of the third sheet on the storage unit.

(Configuration 6)

The image forming apparatus according to Configuration 5, in which the control unit determines a conveyance speed of the sheet in accordance with a type of the sheet, and determines the number of circulated sheets of the sheet in accordance with a size of the sheet.

(Configuration 7)

The image forming apparatus according to Configuration 6, in which a conveyance speed of a sheet of which the type of the sheet is thick paper is slower than a conveyance speed of a sheet of which the type of the sheet is plain paper, and in which the number of circulated sheets of a sheet of which the size of the sheet is a first size is smaller than the number of circulated sheets of a sheet of which the size of the sheet is a second size smaller than the first size.

(Configuration 8)

The image forming apparatus according to Configuration 7, in which, in a case where the size of the sheet is the first size, the number of circulated sheets of the sheet is three, and in which, in a case where the size of the sheet is the second size, the number of circulated sheets of the sheet is five.

(Configuration 9)

The image forming apparatus according to Configuration 8, in which the first size is an A3 size, and in which the second size is an A4 size.

(Configuration 10)

The image forming apparatus according to any one of Configurations 1 to 9, in which the control unit causes the image forming unit to form an image on one side of a first-page sheet on the storage unit, then causes the image forming unit to form an image on one side of a second-page sheet on the storage unit, and then causes the image forming unit to form an image on another side of the first-page sheet on the reconveyance path, in which the first sheet is the first-page sheet, in which the second sheet is the second-page sheet, and in which the third sheet is a third-page sheet on the storage unit.

(Configuration 11)

The image forming apparatus according to any one of Configurations 1 to 9, in which the control unit causes the image forming unit to form an image on one side of a first-page sheet on the storage unit, then causes the image forming unit to form an image on one side of a second-page sheet on the storage unit, then causes the image forming unit to form an image on one side of a third-page sheet on the storage unit, and then causes the image forming unit to form an image on another side of the first-page sheet on the reconveyance path, in which the first sheet is the first-page sheet, in which the second sheet is the second-page sheet, and in which the third sheet is a four-page sheet on the storage unit.

(Configuration 12)

The image forming apparatus according to Configuration 5, in which, in a case where the size of a sheet is a first size, the control unit causes the image forming unit to form an image on one side of a first-page sheet on the storage unit, then causes the image forming unit to form an image on one side of a second-page sheet on the storage unit, then causes the image forming unit to form an image on another side of the first-page sheet on the reconveyance path, regards the first sheet as the first-page sheet, regards the second sheet as the second-page sheet, and regards the third sheet as a third-page sheet on the storage unit, and in which, in a case where the size of a sheet is a second size smaller than the first size, the control unit causes the image forming unit to form an image on one side of a first-page sheet on the storage unit, then causes the image forming unit to form an image on one side of a second-page sheet on the storage unit, then causes the image forming unit to form an image on one side of a third-page sheet on the storage unit, then causes the image forming unit to form an image on another side of the first-page sheet on the reconveyance path, regards the first sheet as the first-page sheet, regards the second sheet as the second-page sheet, and regards the third sheet as a four-page sheet on the storage unit.

(Configuration 13)

The image forming apparatus according to Configuration 12, in which the first size is an A3 size, and in which the second size is an A4 size.

(Configuration 14)

The image forming apparatus according to Configuration 2, in which, in a case where the third sheet is a leading sheet in the bundle of paper, after the control unit causes the image forming unit to form an image on another side of the first sheet, the control unit causes the image forming unit to form an image on another side of the second sheet on the reconveyance path, and then causes the image forming unit to form an image on one side of the third sheet on the storage unit.

(Configuration 15)

The image forming apparatus according to Configuration 2, in which, in a case where the third sheet is a leading sheet in the bundle of paper, and a size of the third sheet is equal to or smaller than a threshold value, the control unit conveys the third sheet from the storage unit up to a position of the detection unit, and causes the detection unit to detect a type of the third sheet.

(Configuration 16)

The image forming apparatus according to Configuration 15, in which, in a case where the third sheet is a leading sheet in the bundle of paper, and a size of the third sheet is not equal to or smaller than a threshold value, after the control unit causes the image forming unit to form an image on another side of the first sheet, the control unit causes the image forming unit to form an image on another side of the second sheet on the reconveyance path, and then causes the image forming unit to form an image on one side of the third sheet on the storage unit.

(Configuration 17)

An image forming apparatus comprising:

a storage unit configured to store a sheet;

an image forming unit configured to form an image onto the sheet;

a reconveyance path for reconveying a sheet on which an image is formed by the image forming unit on one side, to the image forming unit to form an image on another side of the sheet on which the image is formed on the one side;

a detection unit that is provided on a conveyance path between the storage unit and the image forming unit, and configured to detect a type of a sheet conveyed from the storage unit; and a control unit configured to, in a case where a type of a feeding standby sheet on the storage unit and a type of a refeeding standby sheet on the reconveyance path are the same, cause the image forming unit to form an image on one side of a feeding standby sheet on the storage unit, and in a case where a type of a feeding standby sheet on the storage unit and a type of a refeeding standby sheet on the reconveyance path are not the same, cause the image forming unit to form an image on another side of a refeeding standby sheet on the reconveyance path.

(Configuration 18)

The image forming apparatus according to Configuration 17, in which the control unit causes the detection unit to detect a type of a leading sheet in a bundle of paper stored in the storage unit, and assumes that types of second-page and subsequent sheets in the bundle of paper are the same as the type of the leading sheet.

(Configuration 19)

The image forming apparatus according to Configuration 18, in which, in a case where a feeding standby sheet on the storage unit is a leading sheet in the bundle of paper, the control unit causes the image forming unit to form an image on another side of a refeeding standby sheet on the reconveyance path.

(Configuration 20)

The image forming apparatus according to Configuration 18, in which, in a case where a feeding standby sheet on the storage unit is a leading sheet in the bundle of paper, and a size of a feeding standby sheet on the storage unit is equal to or smaller than a threshold value, the control unit conveys a feeding standby sheet on the storage unit from the storage unit up to a position of the detection unit, and causes the detection unit to detect a type of the feeding standby sheet on the storage unit.

(Configuration 21)

The image forming apparatus according to Configuration 20, in which, in a case where a feeding standby sheet on the storage unit is a leading sheet in the bundle of paper, and a size of a feeding standby sheet on the storage unit is not equal to or smaller than a threshold value, the control unit causes the image forming unit to form an image on another side of a refeeding standby sheet on the reconveyance path.

(Method 1)

A control method of an image forming apparatus including a storage unit configured to store a sheet, an image forming unit configured to form an image onto the sheet, a reconveyance path for reconveying a sheet on which an image is formed by the image forming unit on one side, to the image forming unit to form an image on another side of the sheet on which the image is formed on the one side, and a detection unit that is provided on a conveyance path between the storage unit and the image forming unit, and configured to detect a type of a sheet conveyed from the storage unit, the control method comprising:

first formation of causing the image forming unit to form an image on one side of a first sheet on the storage unit;

second formation of causing the image forming unit to form an image on one side of a second sheet on the storage unit after the first formation;

third formation of causing the image forming unit to form an image on another side of the first sheet on the reconveyance path after the second formation;

fourth formation of, in a case where a type of a third sheet on the storage unit and a type of the second sheet on the reconveyance path are the same, causing the image forming unit to form an image on one side of the third sheet on the storage unit after the third formation, and then causing the image forming unit to form an image on another side of the second sheet on the reconveyance path; and fifth formation of, in a case where a type of the third sheet on the storage unit and a type of the second sheet on the reconveyance path are not the same, causing the image forming unit to form an image on another side of the second sheet on the reconveyance path after the third formation, and then causing the image forming unit to form an image on one side of the third sheet on the storage unit.

(Method 2)

A control method of an image forming apparatus including a storage unit configured to store a sheet, an image forming unit configured to form an image onto the sheet, a reconveyance path for reconveying a sheet on which an image is formed by the image forming unit on one side, to the image forming unit to form an image on another side of the sheet on which the image is formed on the one side, and a detection unit that is provided on a conveyance path between the storage unit and the image forming unit, and configured to detect a type of a sheet conveyed from the storage unit; the control method comprising:

- first formation of, in a case where a type of a feeding standby sheet on the storage unit and a type of a refeeding standby sheet on the reconveyance path are the same, causing the image forming unit to form an image on one side of a feeding standby sheet on the storage unit; and
- second formation of, in a case where a type of a feeding standby sheet on the storage unit and a type of a refeeding standby sheet on the reconveyance path are not the same, causing the image forming unit to form an image on another side of a refeeding standby sheet on the reconveyance path.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-021714, filed Feb. 15, 2023, which is hereby incorporated by reference herein in its entirety.

What is claimed is:

1. An image forming apparatus comprising:

- a storage unit configured to store a sheet;
- an image forming unit configured to form an image onto the sheet;
- a reconveyance path for reconveying a sheet on which an image is formed by the image forming unit on one side, to the image forming unit to form an image on another side of the sheet on which the image is formed on the one side;
- a detection unit that is provided on a conveyance path between the storage unit and the image forming unit, and configured to detect a type of a sheet conveyed from the storage unit; and
- a control unit configured to cause the image forming unit to form an image on one side of a first sheet on the storage unit, then cause the image forming unit to form an image on one side of a second sheet on the storage unit, and then cause the image forming unit to form an image on another side of the first sheet on the reconveyance path,
- wherein, in a case where a type of a third sheet on the storage unit and a type of the second sheet on the reconveyance path are the same, after the control unit causes the image forming unit to form an image on another side of the first sheet, the control unit causes the image forming unit to form an image on one side of the third sheet on the storage unit, and then causes the image forming unit to form an image on another side of the second sheet on the reconveyance path, and
- wherein, in a case where a type of the third sheet on the storage unit and a type of the second sheet on the reconveyance path are not the same, after the control unit causes the image forming unit to form an image on another side of the first sheet, the control unit causes the image forming unit to form an image on another side of the second sheet on the reconveyance path, and then causes the image forming unit to form an image on one side of the third sheet on the storage unit.

2. The image forming apparatus according to claim 1, wherein the control unit causes the detection unit to detect a type of a leading sheet in a bundle of paper stored in the storage unit, and assumes that types of second-page and subsequent sheets in the bundle of paper are the same as the type of the leading sheet.

3. The image forming apparatus according to claim 2, wherein, in a case where the third sheet is a leading sheet in the bundle of paper, after the control unit causes the image forming unit to form an image on another side of the first sheet, the control unit causes the image forming unit to form an image on another side of the second sheet on the reconveyance path, and then causes the image forming unit to form an image on one side of the third sheet on the storage unit.

4. The image forming apparatus according to claim 2, wherein, in a case where the third sheet is a leading sheet in the bundle of paper, and a size of the third sheet is equal to or smaller than a threshold value, the control unit conveys the third sheet from the storage unit up to a position of the detection unit, and causes the detection unit to detect a type of the third sheet.

5. The image forming apparatus according to claim 4, wherein, in a case where the third sheet is a leading sheet in the bundle of paper, and a size of the third sheet is not equal to or smaller than a threshold value, after the control unit causes the image forming unit to form an image on another side of the first sheet, the control unit causes the image forming unit to form an image on another side of the second sheet on the reconveyance path, and then causes the image forming unit to form an image on one side of the third sheet on the storage unit.

6. The image forming apparatus according to claim 1, wherein the control unit determines a conveyance speed of the sheet in accordance with a type of the sheet.

7. The image forming apparatus according to claim 6, wherein a conveyance speed of a sheet of which the type of the sheet is thick paper is slower than a conveyance speed of a sheet of which the type of the sheet is plain paper.

8. The image forming apparatus according to claim 1, wherein, in a case where a size and a type of the third sheet on the storage unit and a size and a type of the second sheet on the reconveyance path are the same, the control unit causes the image forming unit to form an image on one side of the third sheet on the storage unit, and then causes the image forming unit to form an image on another side of the second sheet on the reconveyance path, and wherein, in a case where a size and a type of the third sheet on the storage unit and a size and a type of the second sheet on the reconveyance path are not the same, the control unit causes the image forming unit to form an image on another side of the second sheet on the reconveyance path, and then causes the image forming unit to form an image on one side of the third sheet on the storage unit.

9. The image forming apparatus according to claim 8, wherein the control unit determines a conveyance speed of the sheet in accordance with a type of the sheet, and determines the number of circulated sheets of the sheet in accordance with a size of the sheet.

10. The image forming apparatus according to claim 9, wherein a conveyance speed of a sheet of which the type of the sheet is thick paper is slower than a conveyance speed of a sheet of which the type of the sheet is plain paper, and wherein the number of circulated sheets of a sheet of which the size of the sheet is a first size is smaller than the number of circulated sheets of a sheet of which the size of the sheet is a second size smaller than the first size.

11. The image forming apparatus according to claim 10, wherein, in a case where the size of the sheet is the first size, the number of circulated sheets of the sheet is three, and wherein, in a case where the size of the sheet is the second size, the number of circulated sheets of the sheet is five.

12. The image forming apparatus according to claim 11, wherein the first size is an A3 size, and wherein the second size is an A4 size.

13. The image forming apparatus according to claim 8, wherein, in a case where the size of a sheet is a first size, the control unit causes the image forming unit to form an image on one side of a first-page sheet on the storage unit, then causes the image forming unit to form an image on one side of a second-page sheet on the storage unit, then causes the image forming unit to form an image on another side of the first-page sheet on the reconveyance path, regards the first sheet as the first-page sheet, regards the second sheet as the second-page sheet, and regards the third sheet as a third-page sheet on the storage unit, and wherein, in a case where the size of a sheet is a second size smaller than the first size, the control unit causes the image forming unit to form an image on one side of a first-page sheet on the storage unit, then causes the image forming unit to form an image on one side of a second-page sheet on the storage unit, then causes the image forming unit to form an image on one side of a third-page sheet on the storage unit, then causes the image forming unit to form an image on another side of the first-page sheet on the reconveyance path, regards the first sheet as the first-page sheet, regards the second sheet as the second-page sheet, and regards the third sheet as a four-page sheet on the storage unit.

14. The image forming apparatus according to claim 13, wherein the first size is an A3 size, and wherein the second size is an A4 size.

15. The image forming apparatus according to claim 1, wherein the control unit causes the image forming unit to form an image on one side of a first-page sheet on the storage unit, then causes the image forming unit to form an image on one side of a second-page sheet on the storage unit, and then causes the image forming unit to form an image on another side of the first-page sheet on the reconveyance path, wherein the first sheet is the first-page sheet, wherein the second sheet is the second-page sheet, and wherein the third sheet is a third-page sheet on the storage unit.

16. The image forming apparatus according to claim 1, wherein the control unit causes the image forming unit to form an image on one side of a first-page sheet on the storage unit, then causes the image forming unit to form an image on one side of a second-page sheet on the storage unit, then causes the image forming unit to form an image on one side of a third-page sheet on the storage unit, and then causes the image forming unit to form an image on another side of the first-page sheet on the reconveyance path, wherein the first sheet is the first-page sheet, wherein the second sheet is the second-page sheet, and wherein the third sheet is a four-page sheet on the storage unit.

17. An image forming apparatus comprising:

a storage unit configured to store a sheet;

an image forming unit configured to form an image onto the sheet;

a reconveyance path for reconveying a sheet on which an image is formed by the image forming unit on one side, to the image forming unit to form an image on another side of the sheet on which the image is formed on the one side;

a detection unit that is provided on a conveyance path between the storage unit and the image forming unit, and configured to detect a type of a sheet conveyed from the storage unit; and a control unit configured to, in a case where a type of a feeding standby sheet on the storage unit and a type of a refeeding standby sheet on the reconveyance path are the same, cause the image forming unit to form an image on one side of a feeding standby sheet on the storage unit, and in a case where a type of a feeding standby sheet on the storage unit and a type of a refeeding standby sheet on the reconveyance path are not the same, cause the image forming unit to form an image on another side of a refeeding standby sheet on the reconveyance path.

18. The image forming apparatus according to claim 17, wherein the control unit causes the detection unit to detect a type of a leading sheet in a bundle of paper stored in the storage unit, and assumes that types of second-page and subsequent sheets in the bundle of paper are the same as the type of the leading sheet.

19. The image forming apparatus according to claim 18, wherein, in a case where a feeding standby sheet on the storage unit is a leading sheet in the bundle of paper, the control unit causes the image forming unit to form an image on another side of a refeeding standby sheet on the reconveyance path.

20. The image forming apparatus according to claim 18, wherein, in a case where a feeding standby sheet on the storage unit is a leading sheet in the bundle of paper, and a size of a feeding standby sheet on the storage unit is equal to or smaller than a threshold value, the control unit conveys a feeding standby sheet on the storage unit from the storage unit up to a position of the detection unit, and causes the detection unit to detect a type of the feeding standby sheet on the storage unit.

21. The image forming apparatus according to claim 20, wherein, in a case where a feeding standby sheet on the storage unit is a leading sheet in the bundle of paper, and a size of a feeding standby sheet on the storage unit is not equal to or smaller than a threshold value, the control unit causes the image forming unit to form an image on another side of a refeeding standby sheet on the reconveyance path.

22. A control method of an image forming apparatus including a storage unit configured to store a sheet, an image forming unit configured to form an image onto the sheet, a reconveyance path for reconveying a sheet on which an image is formed by the image forming unit on one side, to the image forming unit to form an image on another side of the sheet on which the image is formed on the one side, and a detection unit that is provided on a conveyance path between the storage unit and the image forming unit, and configured to detect a type of a sheet conveyed from the storage unit, the control method comprising:

first formation of causing the image forming unit to form an image on one side of a first sheet on the storage unit;

second formation of causing the image forming unit to form an image on one side of a second sheet on the storage unit after the first formation;

third formation of causing the image forming unit to form an image on another side of the first sheet on the reconveyance path after the second formation;

fourth formation of, in a case where a type of a third sheet on the storage unit and a type of the second sheet on the reconveyance path are the same, causing the image forming unit to form an image on one side of the third sheet on the storage unit after the third formation, and then causing the image forming unit to form an image on another side of the second sheet on the reconveyance path; and fifth formation of, in a case where a type of the third sheet on the storage unit and a type of the second sheet on the reconveyance path are not the same, causing the image forming unit to form an image on another side of the second sheet on the reconveyance path after the third formation, and then causing the image forming unit to form an image on one side of the third sheet on the storage unit.

23. A control method of an image forming apparatus including a storage unit configured to store a sheet, an image forming unit configured to form an image onto the sheet, a reconveyance path for reconveying a sheet on which an image is formed by the image forming unit on one side, to the image forming unit to form an image on another side of the sheet on which the image is formed on the one side, and a detection unit that is provided on a conveyance path between the storage unit and the image forming unit, and configured to detect a type of a sheet conveyed from the storage unit; the control method comprising:

first formation of, in a case where a type of a feeding standby sheet on the storage unit and a type of a refeeding standby sheet on the reconveyance path are the same, causing the image forming unit to form an image on one side of a feeding standby sheet on the storage unit; and second formation of, in a case where a type of a feeding standby sheet on the storage unit and a type of a refeeding standby sheet on the reconveyance path are not the same, causing the image forming unit to form an image on another side of a refeeding standby sheet on the reconveyance path.

* * * * *